(12) United States Patent
Mizota et al.

(10) Patent No.: US 9,394,631 B2
(45) Date of Patent: Jul. 19, 2016

(54) CORE-SHEATH COMPOSITE FIBER AND METHOD FOR PRODUCING SAME

(75) Inventors: Junichi Mizota, Nagoya (JP); Takashi Ida, Nagoya (JP); Hidetoshi Takanaga, Nagoya (JP)

(73) Assignee: Toray Industries, Inc. (JP)

( * ) Notice: Subject to any disclaimer, the term of this patent is extended or adjusted under 35 U.S.C. 154(b) by 203 days.

(21) Appl. No.: 14/348,184

(22) PCT Filed: Aug. 27, 2012

(86) PCT No.: PCT/JP2012/071603
§ 371 (c)(1),
(2), (4) Date: Mar. 28, 2014

(87) PCT Pub. No.: WO2013/047051
PCT Pub. Date: Apr. 4, 2013

(65) Prior Publication Data
US 2014/0256203 A1 Sep. 11, 2014

(30) Foreign Application Priority Data
Sep. 30, 2011 (JP) ................................. 2011-217025

(51) Int. Cl.
*D01D 5/10* (2006.01)
*D01D 5/34* (2006.01)
*D01F 8/12* (2006.01)
(Continued)

(52) U.S. Cl.
CPC .............. *D01F 8/14* (2013.01); *C08G 63/6886* (2013.01); *D01D 5/10* (2013.01); *D01D 5/253* (2013.01); *D01D 5/34* (2013.01); *D01F 6/60* (2013.01); *D01F 8/12* (2013.01); *D03D 15/0027* (2013.01); *D04B 1/16* (2013.01); *Y10T 428/2929* (2015.01); *Y10T 442/30* (2015.04); *Y10T 442/3154* (2015.04); *Y10T 442/40* (2015.04); *Y10T 442/444* (2015.04)

(58) Field of Classification Search
CPC ......... C08G 63/6886; D01F 8/14; D01F 8/12; D10B 2331/04; D10B 2331/042; D10B 2331/02; D10B 2331/021; D04H 1/4382; D04H 1/435; D04H 1/4334; D04H 1/4342; D03D 15/0027; Y10T 442/444; Y10T 442/3154; Y10T 428/2929
USPC .......... 442/199, 200, 311, 361, 364; 428/373, 428/374
See application file for complete search history.

(56) References Cited

U.S. PATENT DOCUMENTS 3,965,071 A * 6/1976 McClelland ........... C08G 63/85
528/279
4,233,355 A * 11/1980 Sato ......................... D01D 5/30
264/172.13

FOREIGN PATENT DOCUMENTS

| JP | 61-63768 | 4/1986 |
| JP | 63-8207 | 1/1988 |
| JP | 7-310235 | 11/1995 |
| JP | 2003-336128 | 11/2003 |

(Continued)

*Primary Examiner* — Jennifer Chriss
*Assistant Examiner* — Frank Vineis
(74) *Attorney, Agent, or Firm* — DLA Piper LLP (US)

(57) ABSTRACT

A core-sheath composite fiber includes a core component including an easily alkaline elutable polyester with a main repeating unit constructed of ethylene terephthalate containing 2.0 to 5.5 mol % of an isophthalic acid component containing a metal sulfonate group relative to a total acid component and 3.0 to 6.0 mol % of an adipic acid component relative to the total acid component, and a sheath component including a polyamide.

16 Claims, 1 Drawing Sheet

(51) Int. Cl.
*D01F 8/14* (2006.01)
*D03D 15/00* (2006.01)
*D04B 1/16* (2006.01)
*D01D 5/253* (2006.01)
*D01F 6/60* (2006.01)
*C08G 63/688* (2006.01)

(56) References Cited

FOREIGN PATENT DOCUMENTS

| | | |
|---|---|---|
| JP | 2005-194681 | 7/2005 |
| JP | 2006-322131 | 11/2006 |
| JP | 2008-156769 | 7/2008 |

\* cited by examiner

CORE-SHEATH COMPOSITE FIBER AND METHOD FOR PRODUCING SAME

TECHNICAL FIELD

This disclosure relates to a core-sheath composite fiber comprising polyester and polyamide. More particularly, this disclosure relates to a favorable core-sheath composite fiber for obtaining an ultrathin polyamide fiber, a woven or knitted fabric and a fibrous product.

BACKGROUND

Polyamide fibers represented by polycaproamide and polyhexamethylene adipamide, and polyester fibers represented by polyethylene terephthalate and polybutylene terephthalate are being widely used, not only for clothing uses, but also for interiors, vehicle interiors, industrial uses, etc. because of excellent mechanical properties and dimensional stability thereof.

In the melt spinning of an ultrathin fiber for the purpose of giving softness to fiber, a fiber whose single-yarn diameter is of micron size can be obtained by melt spinning a single polymer. However, with regard to an ultrathin fiber that cannot be obtained by melt spinning a single polymer, it is mainstream practice to obtain a composite section fiber by the composite spinning of polymers of different solubilities and obtain an ultrathin fiber by performing a fiber-splitting treatment or dissolving and removing the polymer whose solubility is high.

For example, Japanese Patent Application Publication Nos. 2003-336128 and 2006-322131 show as examples a split type composite fiber comprising a polyamide component and a polyester component. The main focus of that fiber is to carry out a chemical fiber splitting treatment with a swelling agent to achieve the uniform division between the polyester component and the polyamide component. Besides, this split type composite fiber is intended to split the polyester component and the polyamide component, and dissolution of the polyester component is not the main focus. Therefore, in the case where the polyester component is dissolved and removed to obtain an ultrathin polyamide fiber, an alkali treatment requires a considerable amount of time, becoming a factor for increased cost. To reduce the alkali treatment time, it is possible to use an alkali solution at high concentration. In reality, however, the alkali solution treatment requires that measures against pollution of working environment and environment pollution be sufficiently taken due to issues in safety of agents. Besides, the working cost of the alkali solution treatment is high, and an increase in concentration of the alkali solution cannot be said to be a favorable method for industrial production in terms of working safety, environmental safety, and cost increases. Besides, the polyester component, being poor in alkaline elutability, has problems of not dissolving entirely, but being likely to partially remain undissolved.

Japanese Patent Application Publication No. 2005-194681 shows, as an example of an easily alkaline-elutable polyester component in a split type composite fiber comprising a polyamide component and a polyester component, a polyester obtained by copolymerization of an aromatic dicarboxylic acid component having a sulfonic acid salt group in a dicarboxylic acid component and polyalkylene glycol having an average molecular weight of 1000 to 10000. However, such a fiber, while having an alkaline elutability, is poor in compatibility with polyamide so that at the time of the yarn-making of a core-sheath composite fiber, separation of inner interface of composite fiber is likely, giving rise to a problem of scatter of fluff.

It could therefore be helpful to provide a core-sheath composite fiber that is able to restrain the separation of inner interface of composite fiber and therefore considerably better fluffing and yarn breakage at the time of the yarn-making of a polyester-and-polyamide core-sheath composite fiber, and that considerably improves the characteristic of alkaline elution of polyester, and a woven or knitted fabric, and also an ultrathin polyamide fiber obtained by dissolving and removing polyester contained in the core-sheath composite fiber, a woven or knitted fabric, and a fibrous product.

SUMMARY

We thus provide:
(1) A core-sheath composite fiber characterized in that a core component is an easily alkaline elutable polyester whose main repeating unit is constructed of ethylene terephthalate and which contains 2.0 to 5.5 mol % of an isophthalic acid component containing a metal sulfonate group relative to a total acid component and 3.0 to 6.0 mol % of an adipic acid component relative to the total acid component, and a sheath component is a polyamide.
(2) The core-sheath composite fiber is described in (1) characterized in that, in a fiber sectional shape, a sheath portion comprising the polyamide is split in three or more portions by the easily alkaline elutable polyester, and at least the easily alkaline elutable polyester is partially exposed on a fiber surface.
(3) The core-sheath composite fiber is described in (1) or (2) characterized in that the easily alkaline elutable polyester contains a titanium compound soluble in polyester at 3 to 10 ppm on a titanium element equivalent basis, and contains a phosphorus compound at 5 to 40 ppm on a phosphorus element equivalent basis.
(4) The core-sheath composite fiber is described in any one of (1) to (3) characterized in that mass ratio between the easily alkaline elutable polyester and the polyamide is in a range of 5:95 to 40:60.
(5) The core-sheath composite fiber is described in any one of (1) to (4) characterized in that a unit reaction rate of a terephthalic acid that caused an ester-amide exchange reaction is 0.0005 to 0.0025%·mm.
(6) A method of producing a core-sheath composite fiber characterized by performing melt spinning, with a core component being an easily alkaline elutable polyester having a main repeating unit is constructed of ethylene terephthalate and by containing 2.0 to 5.5 mol % of an isophthalic acid component containing a metal sulfonate group relative to a total acid component and 3.0 to 6.0 mol % of an adipic acid component relative to the total acid component, and with a sheath component being a polyamide.
(7) The method of producing the core-sheath composite fiber is described in (6) characterized in that an amino terminal group amount of the polyamide is $5 \times 10^{-5}$ to $5.5 \times 10^{-5}$ mol/g.
(8) The method of producing the core-sheath composite fiber is described in (6) or (7) characterized in that a carboxyl terminal group amount of polyester is 35 to 55 eq/t.
(9) A woven or knitted fabric in which a core-sheath composite fiber is used at least in a portion of the woven or knitted fabric, wherein the core-sheath composite fiber is described in any one of (1) to (5) or the core-sheath composite fiber is obtained by using the method for producing the core-sheath composite fiber is described in any one of (6) to (8).

(10) An ultrathin polyamide fiber characterized by being formed through dissolution removal of polyester by performing an alkali treatment on the core-sheath composite fiber is described in any one of (1) to (5) or the core-sheath composite fiber obtained by using the method for producing the core-sheath composite fiber is described in any one of (6) to (8).

(11) A woven or knitted fabric at least a portion of which has the ultrathin polyamide fiber is described in (10).

(12) A fibrous product at least a portion of which has the ultrathin polyamide fiber is described in (10).

The polyester contained in the core-sheath composite fiber, which is copolymerized with an isophthalic acid component that contains metal sulfonate groups, and is further copolymerized with an adipic acid component, is able to restrain separation of the inner interface of composite fiber at the time of yarn-making and considerably better fluffing, yarn breakage or the like. Furthermore, since alkaline elutability improves, it becomes possible to obtain a core-sheath composite fiber that has fast alkaline elution speed, and allows the elution treatment time to be shortened and, therefore, is industrially advantageous.

Still further, by making an ultrathin polyamide fiber through dissolution removal of the polyester contained in the core-sheath composite fiber, it is possible to obtain excellent properties that the related-art polyamide fibers do not have. Woven or knitted fabrics and fibrous products that are very excellent particularly in softness and are pleasant to touch are obtained.

DESCRIPTION OF REFERENCE CHARACTERS

Figure 1A:
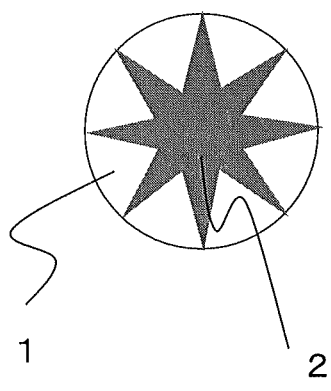
In FIG. 1, (a) to (c) are fiber sectional views schematically showing examples of fiber sectional shapes of core-sheath composite fibers, and (a) to (c) individually show preferred examples.

1: sheath portion
2: core portion

DETAILED DESCRIPTION

Hereinafter, our fibers and methods will be described further in detail.

Our core-sheath composite fibers are core-sheath composite fibers in which an easily alkaline elutable polyester is a core component and a polyamide is a sheath component.

The polyamide that constitutes the core-sheath composite fiber is a resin comprising a high-molecular-weight body in which hydrocarbon groups are linked to a main chain via amide bonds. Such polyamides are made up mainly of polycaproamide (nylon 6), which is excellent in dyeability and mechanical property and is suitable for composite melt spinning together with an easily alkaline elutable polyester. The "mainly" mentioned herein refers to polycaproamide, in terms of ε-caprolactam units of polycaproamide, being at 80 mol % or greater, and more preferably 90 mol % or greater of all the monomer units. As other components, which are not particularly limited, there can be cited, for example, units of amino carboxylic acid, dicarboxylic acid, diamine and the like, which are monomers that constitute polydodecanoamide, polyhexamethylene adipamide, polyhexamethylene azelamide, polyhexamethylene sebacamide, polyhexamethylene dodecanoamide, polymethaxylylene adipamide, polyhexamethylene terephthalamide, polyhexamethylene isophthalamide and the like.

An additive for improving productivity such as heat resistance or the like, may be compounded and an additive to provide a function of delustering, moisture absorption, antimicrobial action, ultraviolet shielding, heat retention or the like may be compounded as long as it is in such an amount range and of such a kind that the fibers are not impaired. However, addition of an inorganic particle exceeding 1 μm is not preferable because yarn-making property and/or durability would decline. Although addition of an inorganic particle, including a white pigment, is not limited, the amount thereof is preferred to be less than or equal to 2.0 mass % and is more preferred to be less than or equal to 1.0 mass % relative to the amount of the polyamide.

The degree of polymerization of the polyamide may be selected as appropriate from an adequate range for the property requirements of an ultrathin polyamide fiber obtained by dissolving and removing the easily alkaline elutable polyester contained in the core-sheath composite fiber or of woven or knitted fabrics or fibrous products of the fiber, an adequate range for stably obtaining the fiber, the woven or knitted fabrics or the fibrous products. However, the degree of polymerization of the polyamide is preferably 2.0 to 3.6 and more preferably 2.4 to 3.3 in 98%-sulfuric acid relative viscosity at 25° C.

The polyester that constitutes the core-sheath composite fiber has as a basic skeleton of a polyethylene terephthalate obtained after an esterified reaction or an ester exchange reaction of a dicarboxylic acid, or an ester-forming derivative thereof and a diol, or an ester-forming derivative thereof.

That polyethylene terephthalate is an easily alkaline elutable polyester that contains 2.0 to 5.5 mol % of an isophthalic acid component that contains metal sulfonate groups relative to a total acid component and 3.0 to 6.0 mol % of an adipic acid component relative to the total acid component.

As for the easily alkaline elutable polyester, it is essential that 3.0 to 6.0 mol % of the adipic acid component relative to the total acid component be copolymerized, in order for the easily alkaline elutable polyester to have an alkaline elutability and an affinity to polyamide. The amount of the adipic acid component relative to the total acid component is more preferably 3.5 to 5.5 mol %, and most preferably 4.0 to 5.5 mol %. If it is less than 3.0 mol %, separation at interfaces of composite fiber occurs and the elutability with alkaline also declines although the color tone and heat resistance of the polyester obtained are good. If it is greater than 6.0 mol %, the heat resistance of the polyester obtained is poor so that the yarn-making property becomes bad.

As monomers that constitute the adipic acid component of the easily alkaline elutable polyester, adipic acid or an ester forming derivative of adipic acid is used. For example, as the adipic acid forming derivative, there can be used an adipic acid forming derivative such as methyl ester, ethyl ester, isopropyl ester, ethylene glycol ester and the like. This adipic acid component is preferred to be an adipic acid or an dimethyl adipate from the viewpoint that the procurement of raw materials is easy.

It is essential that the easily alkaline elutable polyester contain 2.0 to 5.5 mol % of an isophthalic acid component that contains metal sulfonate groups relative to the total acid component, to have a good alkaline elutability. The amount of this isophthalic acid component containing metal sulfonate groups ranges more preferably 2.0 mol % to 4.0 mol %, and most preferably 2.0 mol % to 3.0 mol %. If the amount of the isophthalic acid component is less than 2.0 mol %, the elutability with an alkali declines although the color tone and the heat resistance of the polyester obtained are good. If the amount of the isophthalic acid component is greater than 5.5 mol %, the heat resistance of the polyester is inferior so that the yarn-making property becomes bad.

As the monomers that form the isophthalic acid component that contains metal sulfonate groups in the easily alkaline elutable polyester, a known isophthalic acid component that contains metal sulfonate groups can be used, and is preferably dimethyl 5-sodium sulfoisophthalate.

The easily alkaline elutable polyester is preferred to contain titanium compound soluble in a polyester, and an amount of a titanium compound is 3 to 10 ppm on a titanium element equivalent basis. More preferably, the amount of the titanium compound is 4 to 8 ppm. If the amount of the titanium compound is less than 3 ppm on the titanium element equivalent basis, the polymerization reaction activity is insufficient, the reaction slows and the obtained polyester is colored yellowish. If the amount of the titanium compound is greater than 10 ppm on the titanium element equivalent basis, the activity of the polymerization reaction is good but, due to the high activity, the color tone and the heat resistance of the polyester obtained deteriorate.

The titanium compound soluble in the easily alkaline elutable polyester is preferred to be a titanium complex. As a chelating agent in forming the complex, there can preferably be cited polyhydric alcohol, polyhydric carboxylic acid, hydroxy carboxylic acid, nitrogen-containing carboxylic acid and the like. It is preferred that one or more species of these be used in combination from the viewpoint of the color tone and the heat resistance of the polyester obtained.

As for concrete examples of the chelating agent for the titanium compound soluble in the easily alkaline elutable polyester, as the polyhydric alcohol, there can be cited ethylene glycol, propylene glycol, 1,4-butanediol, mannitol and the like, and as the polyhydric carboxylic acid, there can be cited phthalic acid, trimellitic acid, trimesic acid, hemimellitic acid, pyromellitic acid and the like, and as the hydroxy carboxylic acid, there can be cited lactic acid, malic acid, tartaric acid, citric acid and the like, and as the nitrogen-containing carboxylic acid, there can be cited ethylenediaminetetraacetic acid, nitrilotripropionic acid, carboxy iminodiacetic acid, carboxy methyl iminodipropionic acid, diethylenetriamino acid, triethylenetetraminohexa-acetic acid, iminodiacetic acid, iminodipropionic acid, hydroxy ethyl iminodiacetic acid, hydroxy ethyl iminodipropionic acid, methoxy ethyl iminodiacetic acid and the like. These titanium compounds may be used alone or used in combination. Incidentally, titanium oxide generally used in fiber or the like is excluded from the titanium compound since titanium oxide is not soluble in polyester.

The easily alkaline elutable polyester is preferred to contain a phosphorus compound at 5 to 40 ppm on a phosphorus element equivalent basis. More preferably, the amount thereof is 9 to 35 ppm. If the amount of the phosphorus compound is less than 5 ppm on the phosphorus element equivalent basis, the decomposing reaction of the polyester is apt to be promoted since the adipic acid component and the isophthalic acid component containing metal sulfonate groups have been copolymerized. Therefore, the color tone and the heat resistance of the polyester obtained deteriorate. If the amount of the phosphorus compound is greater than 40 ppm on the phosphorus element equivalent basis, the polymerization reaction catalyst becomes inactive so that the polymerization reaction activity declines and the polymerization reaction slows and, therefore, the polyester obtained is colored yellowish.

As the phosphorus compound, phosphorus compounds indicated by Formula (1) to Formula (5) can be used. Use of the phosphonite compound shown by Formula (1) or Formula (2) and the phosphate compound shown by Formula (3) is preferable in that the easily alkaline elutable polyester is further bettered in the color tone at the time of melt spinning and is excellent in heat resistance, despite the copolymerization of the adipic acid component and the isophthalic acid component containing metal sulfonate groups.

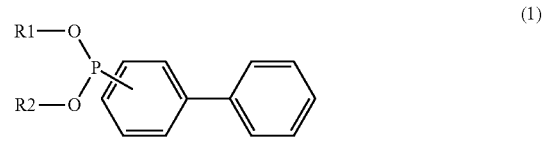

(1)

(In the foregoing Formula (1), R1 to R2 each independently indicate a hydroxyl group, or a hydrocarbon group with a carbon number of 1 to 20.)

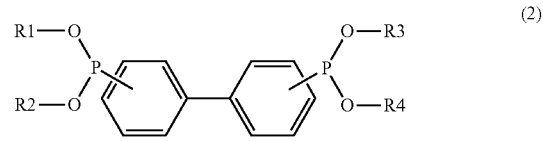

(2)

(In the foregoing Formula (2), R1 to R4 each independently indicate a hydroxyl group, or a hydrocarbon group with a carbon number of 1 to 20.)

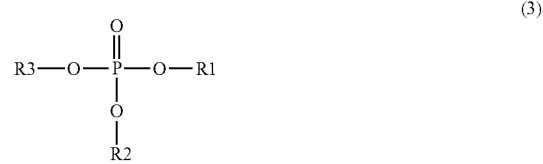

(3)

(In the foregoing Formula (3), R1 to R3 each independently indicate a hydrocarbon group with a carbon number of 1 to 20.)

The deterioration of the color tone or the heat resistance of the polyester occurs due to a side reaction of the polyester polymerization reaction as clearly shown in Saturated Polyester Resin Handbook (Nikkan Kogyo Shinbun, first edition, P.178 to P.198). This side reaction regarding the polyester generates a vinyl terminal group component and an aldehyde component by a metal catalyst activating carbonyl oxygen so that β hydrogen is pulled out. Because the vinyl terminal groups form polyenes, the polyester is colored yellowish. Since the aldehyde component is generated, the main chain ester bond breaks. Hence, a polyester inferior in heat resistance results. In particular, in the case where the polyester has in the polyester skeleton the adipic acid component or the isophthalic acid component containing metal sulfonate groups, coordination to carbonyl oxygen by the metal catalyst is likely to easily occur, and β hydrogen is likely to be pulled out so that the vinyl terminal group component and the aldehyde component are likely to be generated. Because the vinyl terminal groups form polyenes, the polyester is colored yellowish. Since the aldehyde component is generated, the main chain ester bond becomes likely to break. Hence, a polyester inferior in heat resistance and color tone results.

If a titanium compound is used as a polymerization catalyst, the activation of the side reaction due to heat is strong so that the vinyl terminal group component and the aldehyde component are generated in large amounts, and hence a polyester colored yellowish and inferior in heat resistance results. The phosphorus compound, by moderately interacting with the polymerization catalyst, not only performs the role of regulating the activity of the polymerization catalyst, but also makes it less likely for the titanium compound to be coordinated to the carbonyl oxygen of the adipic acid component or the isophthalic acid component containing metal sulfonate groups.

Use of the phosphonite compound of Formula (1) or Formula (2) and the phosphate compound of Formula (3) of the easily alkaline elutable polyester is preferable because the heat resistance and the color tone of the polyester can be tremendously improved while the polymerization activity of the titanium compound is sufficiently kept.

In particular, if the phosphorus compound indicated by the following Formula (4) is used, the polyester is excellent in color tone and heat resistance.

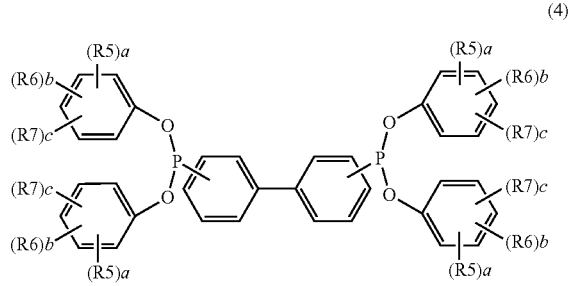

(4)

(In the foregoing Formula (4), R5 to R7 each independently indicate a hydroxyl group, or a hydrocarbon group with a carbon number of 1 to 10. The hydrocarbon group may include one or more of an alicyclic structure, an aliphatic branch structure, an aromatic structure, a hydroxyl group, and a double bond. a, b and c are integers, and satisfy a+b+c=0 to 5.)

As for the phosphorus compound indicated by the forgoing Formula (4), for example, as a compound in which a is 2, b is 0, c is 0, R5 is tert-butyl group, and R5s are at the 2 and 4 positions, there is tetrakis(2,4-di-tert-butylphenyl)[1,1-biphenyl]-4,4'-diylbisphosphonite. This compound is obtainable as IRGAFOS P-EPQ (by Ciba Specialty Chemicals company) or Sandostab P-EPQ (by Clariant (Japan) company).

Among these, the phosphorus compound is preferred to be a phosphorus compound indicated by the following Formula (5), because the color tone and the heat resistance of the polyester obtained become particularly good.

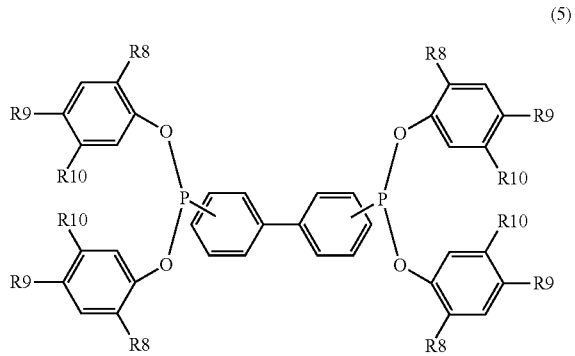

(5)

(In the foregoing Formula (5), R8 to R10 each independently indicate a hydroxyl group, or a hydrocarbon group with a carbon number of 1 to 10. The hydrocarbon group may include one or more of an alicyclic structure, an aliphatic branch structure, an aromatic structure, a hydroxyl group and a double bond.)

As for the phosphorus compound indicated by the foregoing Formula (5), as a compound in which R8 is a tert-butyl group, R9 is a tert-butyl group and R10 is a methyl group there is tetrakis(2,4-di-t-butyl-5-methylphenyl)[1,1-biphenyl]-4,4'-ylbisphosphonite. This compound is obtainable as GSY-P101 (by OSAKI INDUSTRY CO., LTD.).

Furthermore, the phosphorus compound indicated by the foregoing Formula (3) is preferred to be trimethyl phosphate, in which R1 to R3 are all methyl groups, because the color tone and the heat resistance of the polyester obtained become good. This compound is obtainable as TMP (by Daihachi Kagaku company).

The easily alkaline elutable polyester is preferred to substantially not include an element whose absolute specific gravity is greater than or equal to 5. The element whose absolute specific gravity is greater than or equal to 5 is, for example, an antimony element generally used as a polymerization catalyst, a cobalt element or a manganese element that is generally used as an ester exchange catalyst.

The aforementioned "not substantially include" means that the content is less than or equal to 10 ppm, and preferably less than or equal to 5 ppm, and more preferably 0 to 3 ppm.

Yet further, known additives can be contained within ranges that do not impair the fibers. For example, such additives are a by-production inhibiting agent for diethylene glycol (hereinafter DEG) such as tetraethylammonium hydroxide (hereinafter, EAH), lithium acetate (hereinafter, LAH) and the like, an ester exchange reaction catalyst represented by a metal acetate such as magnesium acetate, a radical scavenger represented by IR1010 (pentaerythritol tetrakis[3-(3,5-di-t-butyl-4-hydroxyphenyl)propionate)], by Ciba Specialty Chemicals company) or the like, a delusterant represented by titanium oxide. In particular, the content of EAH is preferred to be less than or equal to 125 ppm, and more preferably less than or equal to 40 ppm, on a nitrogen equivalent basis. The content of LAH is preferred to be 15 to 70 ppm, and more preferred to be 25 to 55 ppm, as lithium element. The by-production inhibiting agent for DEG may also be used in combination.

As for magnesium acetate for use as the ester exchange reaction catalyst, the absolute specific gravity of magnesium element is less than or equal to 5, which is preferable. Its content, as magnesium element, is preferred to be 40 ppm to 100 ppm, and more preferably 50 ppm to 90 ppm.

Incidentally, titanium oxide for use as a delusterant may also be contained, and can be contained up to 2.5 mass % in terms of titanium oxide concentration, to stably carry out the fiber spinning of the easily alkaline elutable polyester obtained.

The mass ratio between the easily alkaline elutable polyester and the polyamide contained in the core-sheath composite fiber may be selected as appropriate from an adequate range for the property requirements of an ultrathin polyamide fiber obtained by dissolving and removing the easily alkaline elutable polyester contained in the core-sheath composite fiber or of woven or knitted fabrics or fibrous products of the fiber, an adequate range for stably obtaining the fiber, the woven or knitted fabrics or the fibrous products. However, the mass ratio is preferably 5:95 to 40:60 in terms of the mass ratio between the easily alkaline elutable polyester and the polyamide, and more preferably 10:90 to 40:60 from the viewpoint of differentiation from the degree-of-fineness region obtained by direct fiber spinning. To control the ester-amide exchange reaction to a particularly preferable state, 10:90 to 30:70 is most preferable. If the mass ratio of the polyamide exceeds 95, the degree of fineness of the ultrathin polyamide fiber obtained by dissolving and removing the easily alkaline elution polyester is within the degree-of-fineness region obtained by direct fiber spinning, and can be obtained by the melt spinning of a single polymer and, therefore, has no merit. If the mass ratio of the polyamide is less than 60, there occurs a case where the amount of a solvent needed to dissolve and remove the easily alkaline elutable polyester becomes large, or the like, that is, the mass ratio of the polyamide as mentioned above is not preferable from the viewpoint of safety or natural environment protection, or from the economic viewpoint. The ultrathin polyamide fiber obtained by dissolving and removing the easily alkaline elutable polyester becomes too thin in comparison with the core-sheath composite fiber prior to the dissolution and removal. Therefore, when the fiber is made into a woven or knitted fabric or the like, the textile density may possibly become rough so that textile design of the fibrous product can possibly become hard or the fibrous product can possibly become less in variations of products.

As for the core-sheath composite fiber, the unit reaction rate (A) of a terephthalic acid that caused the ester-amide exchange reaction is preferred to be 0.0005 to 0.0025%·mm. The aforementioned unit reaction rate (A) of the terephthalic acid that caused the ester-amide exchange reaction is a value obtained by dividing the exchange reaction rate (T) of the ester-amide bonded terephthalic acid by the surface area (S) of inner interface of composite fiber per unit volume of the core-sheath composite fiber. In the case where the unit reaction rate (A) is less than 0.0005%·mm, the inner interface of composite fiber is likely to separation and fluff is likely to scatter. Besides, in the case where the unit reaction rate (A) exceeds 0.0025%·mm, the reaction with the terephthalic acid at the inner interface of composite fiber occurs, and in this reaction process, gel is likely to be generated, and the yarn-making property is likely to become bad. More preferably, the unit reaction rate (A) is 0.0009 to 0.0020%·mm.

The exchange reaction rate (T) of the terephthalic acid that caused the ester-amide exchange reaction is a value calculated from a signal quantified value (A1) of the ester-amide bonded terephthalic acid and the signal quantified value (A2) of the total terephthalic acid obtained by measuring $^1$H-NMR spectra, with respect to the exchange reaction rate of the terephthalic acid that caused the ester-amide exchange reaction, by $T=(A1/A2)\times100$. Besides, the unit reaction rate (A) of the terephthalic acid that caused the ester-amide exchange reaction is a value calculated from the exchange reaction rate (T) of the terephthalic acid that caused the ester-amide exchange reaction and the surface area (S: $mm^2/mm^3$) of the inner interface of composite fiber per 1 $mm^3$ of the core-sheath type composite section fiber, by $A(\%\cdot mm)=T/S$. Besides, the signal quantified value (A1) of the ester-amide bonded terephthalic acid, the signal quantified value (A2) of the total terephthalic acid and the surface area (S) of the inner interface of composite fiber are as described below.

The ester-amide exchange reaction is considered to be a reaction that occurs solely at the inner interface between the easily alkaline eluting polyester and the polyamide of composite fiber. The effect of further yarn-making property improvement can be exercised by controlling the ester-amide exchange reaction. Besides, the exchange reaction rate (T) of the ester-amide bonded terephthalic acid is the reaction rate of the core-sheath type composite section fiber as a whole. However, as mentioned above, portions where the reaction is happening occur at the inner interface of composite fiber, and the area where the reaction can happen varies depending on the design of the core-sheath type composite section fiber such as the single yarn fineness degree, the composite ratio, the number of layers or the like. For example, as for the value calculated by the unit reaction rate (A), provided that the exchange reaction rate (T) remains at the same value, in the case where the area of the inner interface of composite fiber where the reaction is happening is large, the unit reaction rate (A) is small indicating that the ester-amide reaction is restrained, and in the case where the area of the inner interface of composite fiber where the reaction is happening is small, the unit reaction rate (A) is large indicating that the ester-amide reaction is progressing. Therefore, the surface area of the inner interface of composite fiber per unit volume of the core-sheath composite fiber is assumed, and the exchange reaction rate (T) is divided by that surface area, for evaluation of the state of the ester-amide exchange reaction.

The amount of amino terminal groups of the polyamide that constitutes the sheath component of the core-sheath composite fiber is preferred to be $5\times10^{-5}$ to $5.5\times10^{-5}$ mol/g and, more preferably, $5.1\times10^{-5}$ to $5.3\times10^{-5}$ mol/g. In the case where the amount of amino terminal groups of the polyamide is less than $5\times10^{-5}$ mol/g, the dyeability of the ultrathin polyamide fiber obtained by eluting and removing the easily alkaline elutable polyester contained in the obtained core-sheath composite fiber deteriorates so that when a fibrous product obtained from this is dyed, the color development characteristic is inferior and, in addition, the inner interface of composite fiber between the polyester and the polyamide is likely to exfoliate, and fluff tends to scatter. In the case where the amount of amino terminal groups of the polyamide component exceeds $5.5\times10^{-5}$ mol/g, the occurrence of the inter-polyester-polyamide ester-amide exchange reactants at the inner interface of composite fiber increases so that yarn breakage tends to increase. The amount of amino terminal groups of the polyamide can be adjusted by known methods.

The amount of carboxyl terminal groups of the polyester that constitutes the core component of the core-sheath composite fiber is preferred to be 35 to 55 eq/t (eq indicates equivalent amount, and t indicates ton.) and, more preferably, 40 to 50 eq/t. In the case where the amount of carboxyl terminal groups of the polyester is less than 35 eq/t, the inner interface between the polyester and the polyamide of composite fiber is likely to exfoliate, and the problem of fluff scattering occurs. Besides, in the case where the amount of carboxyl terminal groups of the polyester exceeds 55 eq/t, the occurrence of inter-polyester-polyamide ester-amide exchange reactants increases at the inner interface of composite fiber so that the yarn breakage tends to increase. Incidentally, to adjust the amount of carboxyl terminal groups of the polyester that constitutes the core component of the core-sheath type composite section fiber mentioned above, ordinary polyester's carboxy terminal group amount control means can be applied; for example, the adjustment can be carried out by changing the final polymerization temperature.

The single yarn fineness degree of the ultrathin polyamide fiber obtained by dissolving and removing the easily alkaline elutable polyester of the core-sheath composite fiber is preferably 0.1 to 0.5 dtex, and more preferably 0.1 to 0.3 dtex, and particularly preferably 0.2 to 0.3 dtex. The single yarn fineness degree of this ultrathin polyamide fiber, in the case of being calculated from the core-sheath composite fiber, can be calculated from the total degree of fineness of the core-sheath composite fiber, the number of filaments, the number of polyamide layers, and the composite ratio of the polyamide.

For example, in the case where the total degree of fineness is 54 decitex, 18 filaments are present, the composite form has 8 layers of polyamide component being disposed by the easily alkaline elutable polyester, and the composite ratio of the polyamide is 80 mass %, the single yarn fineness degree is calculated as in 54×0.8÷18÷8=0.3 decitex. In the case where the single yarn fineness degree is found from a woven or knitted fabric or a fibrous product, ultrathin polyamide fiber yarn threads are taken from the woven or knitted fabric or the fibrous product, and an initial load is applied to the yarn threads, and after samples are taken, the yarn length, the mass and the number of filaments of each sample are measured, and an apparent total degree of fineness and a single yarn fineness degree are calculated. If the single yarn fineness degree of the ultrathin polyamide fiber is less than 0.1 dtex, light reflects diffusely so that the color development characteristic is inferior, the dyeing robustness becomes bad or the like. Thus, the quality aspect of the textile and the fibrous product is apt to be degraded. An ultrathin polyamide fiber whose single yarn fineness degree exceeds 0.5 dtex can be obtained by the melt spinning with a single polymer as well and, therefore, has no merit.

Figure 1B:
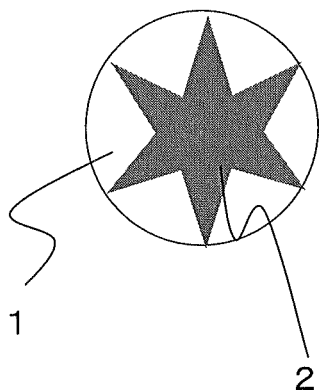
Figure 1C:
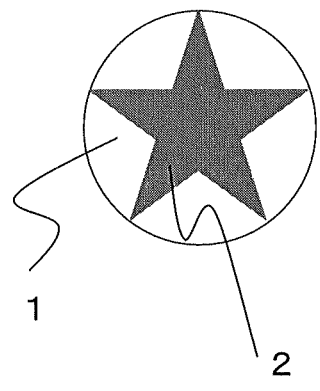

As the fiber sectional shape that forms the core-sheath composite fiber, it is preferred that a sheath portion made of polyamide be split in three or more layers by the easily alkaline elutable polyester, and at least the easily alkaline elutable polyester be partially exposed on a fiber surface. For example, in the cases of fiber sectional shapes of FIG. 1(a) to (c), it suffices that a core portion 2 is constructed of an easily alkaline elutable polyester that continuously exists, and is disposed to extend in radial line directions from a fiber center portion. As a preferred shape, the core portion 2 is disposed so that portions thereof extending in radial line directions taper to the fiber's outer peripheral portion. More preferably, the core portion 2 is disposed in a star shape toward the fiber's outer peripheral portion. As for a sheath portion 1, it suffices that sheath portions made of polyamide are arranged in independent space portions formed between the radial line direction-extending protrusions of the core portion made of the easily alkaline elutable polyester forming layers in the radial line directions. As a preferred shape, it suffices that 3 to 12, more preferably, 4 to 10 independent polyamide layers are disposed. FIG. 1(a) shows a shape in which the sheath portion 1 made of polyamide has 8 rows, FIG. 1(b) shows a shape in which the sheath portion 1 made of polyamide has 6 rows, and FIG. 1(c) shows a shape in which the sheath portion 1 made of polyamide has 5 rows. It suffices that the concrete number of divisions of the sheath portion made of polyamide is determined taking into account sensory characteristics and the like required of the obtained woven or knitted fabric such as soft feel or the like.

At least the easily alkaline elutable polyester being partially exposed on the fiber surface means that as shown in FIGS. 1(a) to (c), the core portion 2 is disposed to extend in the radial line directions from the fiber center portion and that portions of the distal end portions are exposed on the fiber surface. In the case where the polyester is dissolved and removed, the polyester exposed on the fiber surface immerges directly in the alkali solution and therefore easily dissolves, and if polyester is not exposed (polyamide covers the polyester), there results a structure that is relatively hard to dissolve. Therefore, if a distal end portion that constitutes the polyester is covered with the polyamide, dissolution failure becomes likely to occur. Preferably, the number of polyester distal end portion exposed on the fiber surface is preferred to be greater than or equal to N−2 with respect to the total number N of the distal end portions.

Incidentally, the number of polyester distal end portions exposed on the fiber surface is found by cutting out a thin cut section of about 6 microns in thickness in a fiber transverse direction, after fixing the fiber with wax or the like according to need, and observing a fiber cross-section under an optical microscope (80iTP-DPH-S by Nikon corporation).

The polyester and the polyamide are a combination of different kinds of polymers, and are likely subject to interface separation so that the proportion of exposure of polyester on the fiber surface is preferred to be relatively small. Therefore, the proportion of the total length of the exposed portion of the polyester to the fiber section circumferential length, that is, the percentage of exposure, is preferred to be 1 to 10%. If the proportion exceeds 10%, interface separation becomes likely to occur at the time of a yarn-making step and, therefore, the problem of occurrence of fluff is concerned. If the exposure of the polyester is great, yarn breakage in the yarn-making step and yarn breakage in a high-degree process (yarn processing, weaving, knitting or the like) more often occur, and the productivity declines.

Incidentally, the percentage of exposure of polyester is obtained by cutting out a thin cut section of about 6 microns in thickness in a fiber transverse direction, for example, after fixing the fiber with wax, or the like, according to need, and then photographing a fiber section under a microscope, and measuring in the photograph the fiber diameter and the length of an exposed portion via a flexible curve ruler, and calculating the proportion of the exposed portion of the polyester to the fiber section circumference length (2π×fiber diameter).

The method of producing the woven or knitted fabric will be described.

The woven fabric can be formed as a woven fabric by performing weaving by a normal method. First, warping is carried out by placing fibers for the warp on creel, and the fibers are wound around the beam, and subsequently the fibers wound around the beam are sized and dried. Preparation of the warp is thus carried out. Subsequently, the warp is placed through the reed of a weaving machine, and weft is driven to make a woven fabric. As for the weaving machine, there exist kinds of machines such as a shuttle weaving machine, an air jet loom weaving machine, a water jet loom weaving machine, a rapier loom, a gripper shuttle weaving machine or the like. The woven fabric may be produced by any weaving machine. Preferably, the weaving machine is an air jet loom weaving machine or a water jet loom weaving machine, both of which are high in productivity.

On the basis of the way of driving weft, several weave structures exist such as a plain weave structure, a twill weave structure (twill), a satin weave structure (satin) and the like. Any weave structure can be chosen according to purpose. Furthermore, with regard to the warp and the weft for use for the woven fabric, it is necessary that the core-sheath composite fiber is used in at least a portion of the warp and the weft. The rest of the fibers are not particularly limited to natural fibers, chemical fibers or the like.

The knitted fabric can be formed as a knitted fabric by performing knitting by a normal method. As for the knitting machine, there exists kinds such as a flat knitting machine, a circular knitting machine, a warp knitting machine or the like. The knitted fabric may be produced by any knitting machine.

On the basis of knitting, there exist several knit structures such as circular knitting, and in the case of flat knitting, structures including plain knitting, rib knitting, purl knitting and interlock (double knitting), and in the case of warp knitting, structures including an atlas structure, a Denbigh structure, a cord structure and the like. Any knitting structure can be chosen according to purpose. Furthermore, with regard to the yarn for use in the knitted fabric, it is necessary that the core-sheath composite fiber is used in at least a portion of the yarn. The rest of the fibers are not particularly limited to natural fibers, chemical fibers or the like.

The core-sheath composite fiber can be obtained directly as a woven or knitted fabric or a fibrous product, and also are able to be provided as a woven or knitted fabric that has at least in a portion thereof the core-sheath composite fiber. By performing an alkali treatment such as the fiber-splitting treatment, dissolution removal, a fiber-splitting/shrinkage treatment or the like, it becomes possible to obtain various woven or knitted fabrics and fibrous products.

The ultrathin polyamide fiber, the woven or knitted fabric and the fibrous product that have at least in a portion thereof the ultrathin polyamide fiber can be obtained by dissolving and removing the easily alkaline elutable polyester of the core-sheath composite fiber by the alkali treatment. Dissolving and removing refers to dissolving and removing 97 to 100% of the easily alkaline elutable polyester contained in the core-sheath composite fiber by the alkali treatment. As the kind of alkali for use for the dissolution removal there can be cited, for example, strong alkalis, including hydroxides of alkali metals such as sodium hydroxide, potassium hydroxide, lithium hydroxide and the like. It is preferable to use sodium hydroxide. The alkali concentration and the temperature in the dissolution removal can be arbitrarily set so that the easily alkaline elutable polyester is dissolved and only the ultrathin polyamide fiber is left. For example, in the case where caustic soda (sodium hydroxide) is used, the concentration is preferred to be a 5 to 80 g/l aqueous solution. If the concentration exceeds 80 g/l, the handling involves risk to production workers. In the case where the concentration is less than 5 g/l, long time for dissolution removal is required so that productivity declines. Furthermore, caustic soda is preferred to be provided as a 10 to 50 g/l aqueous solution. Besides, the temperature of the aqueous solution is preferred to be 60 to 120° C. If the temperature of the aqueous solution exceeds 120° C., the polyamide (particularly in the case of nylon 6), fiber strength declines, the physical property of the woven or knitted fabric such as tear strength or burst strength, declines. In the case where the temperature is less than 60° C., the hydrolysis speed becomes slow and long time for dissolution removal is required so that productivity declines.

The woven or knitted fabric may be subjected to finish and treatment processes. As the finish processing, it is permissible to perform physical processing (calendering processing and the like) that carries out a finish by physically changing the fiber structure by mechanically pressurizing/heating or rubbing the woven or knitted fabric, or chemical processing that, by a treatment with a chemical agent such as resin or the like, provides a new function (water repellency/oil repellency, moisture permeation/waterproofing, flame proofing/flame retardation, mildew proofing, mite control, deodorizing/odor elimination, antifouling, crease proofing, antistatic).

The fibrous product can be suitably used not only for use in clothing, including inner garments such as camisoles, shorts and the like, leg knits such as stockings, socks and the like, sports/casual wear such as shirts, blousons and the like, pants, coats, men's/women's clothing and the like, but also for use in clothing materials, including bra cups, pads and the like, use in interiors, including curtains, carpets, mats, furniture and the like, use in technological materials, including water absorbing felt, polishing cloths, use in industrial materials, including filters and the like, and use in vehicle interiors.

The method of producing the core-sheath composite fiber will be described.

As for the core-sheath composite fiber, the production thereof by melt spinning is the most excellent from the viewpoint of composite formability, productivity and cost. With regard to the production method by melt spinning, the core-sheath composite fiber can be produced any method such as a method in which spinning-drawing steps are continuously performed (direct spinning and drawing method), a method in which an undrawn yarn is temporarily wound up and then is drawn (two-step method), a method in which the spinning speed is set to a high speed such as 3000 m/min or higher so that the drawing step is substantially omitted (high-speed spinning method) and the like. A yarn processing such as false twist, air intermingling or the like, may be performed according to need.

The production by the direct spinning and drawing method will be shown below as an example.

First, a melting portion will be described. For the melting of the polyamide and the easily alkaline elutable polyester, a pressure melter method and an extruder method are cited. However, neither one is particularly restrictive. As for the melt temperature (so called "heat keeping" temperature around polymer piping or spinning pack), performing the melt spinning at as low a temperature as possible is preferable because it allows the ester-amide exchange reaction to be controlled at the time of melt spinning so that the yarn-making property will improve. In particular, by controlling the temperature of in a nozzle at the time of junction of the polyamide and the easily alkaline elutable polyester, the yarn-making property is likely to become good. Therefore, although it is preferred that the temperature in the nozzle can be directly measured, a measured value of the spinning temperature at the nozzle discharge surface is used as a substitute.

As for the spinning temperature, melt spinning at as low a temperature as possible restrains the ester-amide exchange reaction at the time of melt spinning so that spinnability improves. Concretely, the spinning temperature is preferred to be within +70° C. from the melting point of a polymer that has the lower melting point among the polyamide and the easily alkaline eluting polyester, and more preferably within +60° C.

The polyamide and the easily alkaline elutable polyester having flown in the spinning pack are caused to join into a confluence and be formed into a split composite section by a known nozzle, and discharged out from the nozzle.

The core-sheath composite fiber discharged from the nozzle is cooled, solidified, and provided with an oil agent, and then pulled up. The pull-up speed is preferred to be 1000 to 5000 m/min, and it is preferable that the drawing ratio be appropriately set so that the elongation percentage of the drawn yarn is 30 to 50%, and then No. 1 godet roll be set to a thermosetting temperature of 80 to 100° C. and the No. 2 godet roll be set to a thermosetting temperature of 150 to 180° C., and that drawing and heat treatment be performed, and that winding-up be performed at a speed of 3000 to 5000 m/min. In the process step up to the winding-up, a known interlacing apparatus may be used to perform the intermingling. If necessary, the number of intermingle can be increased by subjecting the fiber to the apparatus two or more times. Furthermore, immediately prior to the winding-up, it is also possible to additionally apply an oil agent.

EXAMPLES

Hereinafter, our fibers and methods will be further described in detail with reference to examples. This disclosure is not limited by the following examples in any manner.

The measurement methods for the properties of the core-sheath composite fiber and the ultrathin polyamide fiber are as follows.

A. Intrinsic Viscosity IV of Polyester

Specimens were dissolved in ortho-chlorophenol, and were subjected to measurement at 25° C. by using an Ostwald viscometer.

B. Color Tone of Polyester

Using a color difference meter (SM Color Computer Type SM-T45, by Suga Test Instrument Co., Ltd.), the color tone of polyester was measured as a Hunter value (b value). In batch polymerization, the color tone of the polyester obtained by sampling in a time corresponding to a half of the discharge step on the basis of a mass equivalent basis was used.

C. Δ Intrinsic Viscosity 280 (Index Indicating Heat Resistance)

Polyester, after being dried at reduced pressure at 150° C. for 12 hours, was heated and melted for 60 minutes at 280° C. in a nitrogen atmosphere. After that, the intrinsic viscosity was measured by the foregoing method A, and the difference between before and after the heating and melting was calculated as Δ intrinsic viscosity 280.

D. DEG Content in Polyester

Polyester, after being heated and decomposed by monomethanol amine, was diluted with 1,6 hexanediol/methanol, and neutralized with terephthalic acid. Then, from a peak area in a gas chromatography, the DEG content was found.

E. Contents of Titanium Element, Phosphorus Element and the Like, in Polyester

Using a fluorescent X-ray elementary analysis apparatus (MESA-500W Type, by Horiba Seisakusho company), elementary analysis was performed regarding contained metals such as phosphorus element, magnesium element and the like.

As for the quantification of titanium element soluble in polyester, a titanium compound insoluble in polyester was removed by performing the following pre-treatment, and then fluorescent X-ray analysis was performed. That is, polyester was dissolved in ortho-chlorophenol (5 g of polyester in 100 g of the solvent), and dichloromethane equal in amount to the polyester solution was added to adjust the viscosity of the solution. After that, particles were sedimented by a centrifugal separator (revolution speed of 18000 rpm, 1 hour). After that, only a supernatant fluid was recovered by decantation. By adding acetone equal in amount to the supernatant fluid, polyester was re-precipitated. After that, filtration through a 3G3 glass filter (by IWAKI) was performed, and the filtration residue was further washed with acetone, and then was vacuum dried for 12 hours at room temperature to remove acetone. With regard to the polyester obtained by performing the foregoing pre-treatment, analysis regarding titanium element was performed.

F. 98% Sulfuric Acid Relative Viscosity (ηr) of Polyamide

Using an Ostwald viscometer, the number of seconds of a drop through the following solution at 25° C. was measured, and calculation was performed by the following expression. When a 98% concentrated sulfuric acid (T1) in which polycaproamide was dissolved to achieve 1 g/100 ml, and a 98% concentrated sulfuric acid (T2) are given, $(\eta r)=T1/T2.$ G. Amount of Carboxyl Terminal Groups (eq/t)

About 1.5 g of polyester chips was accurately weighed, and 40 ml of ortho-cresol was added and dissolution was achieved at 90° C., and then titration was performed using a 0.04-N potassium hydroxide ethanol solution.

H. Amount of Amino Terminal Groups ($\times 10^{-5}$ mol/g)

About 1.0 g of nylon 6 chips was accurately weighed, and was dissolved in 25 ml of a phenol-ethanol mixed solvent (83.5:16.5, volume ratio). Then, titration was performed with a 0.02 N hydrochloride acid aqueous solution. Incidentally, the unit of the amounts of amino terminal groups shown in Table 1 and 3 is $10^{-5}$ mol/g.

I. Melting Point (° C.)

Using a robot DSCRDC220 made by SII NanoTechnology Inc. about 5 mg of a specimen was picked, and was subjected measurement in a nitrogen atmosphere under the following conditions. After the sample was brought to a molten state by heating to the melting point of +35° C., an exothermic peak observed during a temperature decrease to 30° C. at a temperature decrease speed of 20° C./min (temperature-decrease crystallization temperature: Tc) was found. Subsequent to this, the sample was maintained at 30° C. for 3 minutes, and then the temperature at an endothermic peak (melting point: Tm) observed during a temperature increase to the melting point of +35° C. at a temperature increase speed of 20° C./min was found. In the case where two or more endothermic peaks were observed, the point of the greatest peak intensity was determined as the melting point.

J. Unit Reaction Rate (A) of Terephthalic Acid that Caused Ester-Amide Exchange Reaction The unit reaction rate (A) was calculated by the following expression, using the reaction rate T (%) of the terephthalic acid that caused the ester-amide exchange reaction mentioned below and the surface area S of the core of a fiber axis portion per 1 mm$^3$ of the core-sheath type composite section fiber (mm$^2$/mm$^3$):

$$A(\%\cdot mm)=T/S$$

where T is the reaction rate (%) of the terephthalic acid that caused the ester-amide exchange reaction, S is the surface area of the core of the fiber axis portion per 1 mm$^3$ of the core-sheath type composite section fiber (mm$^2$/mm$^3$).

K. Exchange Reaction Rate (T) of Terephthalic Acid that Caused Ester-Amide Exchange Reaction by Nuclear Magnetic Resonance Spectral Analysis (NMR)

The $^1$H-NMR spectrum of the fiber (40 mg of specimen) was measured, and the ratio of the ester-amide bonded terephthalic acid was calculated from the peak area value (a) at 7.89 to 8.00 ppm and the peak area value (b) at 8.25 to 8.34 ppm.

Exchange reaction rate T (%) of the ester-amide bonded terephthalic acid:

$$T(\%)=(A1/A2)\times 100$$

Signal quantified value A1 of the ester-amide bonded terephthalic acid:

$$A1=(a-b)/2$$

Signal quantified value A2 of the total terephthalic acid:

$$A2=100b/0.55$$

As for the $^1$H-NMR spectrum of the terephthalic acid of the easily alkaline soluble copolymerized polyester, a main peak coupling to $^{12}$C and satellite peaks coupling to $^{13}$C (two equally splitted peaks at both sides of the main peak (in the vicinity of 7.89 to 8.00 ppm and the vicinity of 8.25 to 8.34 ppm) are usually observed.

Then, in the polyester where ester-amide exchange has occurred, a signal derived from the ester-amide bonded terephthalic acid is observed in the vicinity of 7.89 to 8.00 ppm.

The satellite peak coupling to $^{13}$C observed in the vicinity of 7.89 to 8.00 ppm and the equal satellite peak coupling to $^{13}$C observed in the vicinity of 8.25 to 8.34 ppm have no substantial difference between before and after the ester-amide exchange reaction.

Hence, the ester-amide bonded terephthalic acid amount is obtained by subtracting the value of the satellite peak area coupling to $^{13}$C observed in the vicinity of 8.25 to 8.34 ppm from the value of the peak area in the vicinity of 7.89 to 8.00 ppm and dividing the difference by 2 since there are two protons at the ortho positions of the carboxy groups of the ester-amide bonded terephthalic acid.

Concretely, the signal quantified value (A1) of the ester-amide bonded terephthalic acid was calculated as (a−b)/2.

Since the satellite peaks coupling to $^{13}$C are observed as two equally splitted peaks and the natural existence ratio of $^{13}$C is 1.1%, the signal quantified value (A2) of the total terephthalic acid was calculated as 100b/0.55.

Details of $^1$H-NMR measurement conditions are mentioned below.

Apparatus: DRX-500 (by JEOL company)
Observation frequency: 499.8 MHz
Observation nucleus: $^1$H
Observation width: 6 kHz
Solvent: HFIP-d2
Concentration: 40 mg/1 g
Chemical shift reference: 4.4 ppm of remainder proton in solvent
Cumulated number: 64
Temperature: 25° C.
Repetition time: 10.0 sec
Spin: no spin L. Observation of Fiber Cross-Section Under Transmission Type Electron Microscope (TEM)

The fiber cross-section was observed under TEM. The fiber cross-section was observed with the observation magnification changed according to need; for instance, 1000 times when the entire fiber yarn thread was observed, and 3000 times when a single yarn was observed.

M. Surface Area (S) of Core of Fiber Axis Portion Per 1 mm$^3$ of Core-Sheath Type Composite Section Fiber After the fiber section was photographed under TEM as described in L above, the fiber diameter and the circumference length of the core portion were measured in the photograph, and the surface area (S) of the core of the fiber axis portion per 1 mm$^3$ of the core-sheath type composite section fiber was calculated by the following expression:

$$S(mm^2/mm^3)=X(mm) \times Y(mm/mm^3) \times \text{correction coefficient}$$

(a) Core portion's circumference length (mm): X
(b) Fiber length (mm) for unit volume (1 mm$^3$): Y (mm/mm$^3$)

$$Y(mm/mm^3)=1 \div \text{fiber sectional area (calculated value)}$$

Fiber sectional area (mm$^2$)=[fiber diameter (calculated value)/2]$^2 \times \pi$ Fiber diameter (calculated value) (mm)=11.28×√(single yarn fineness degree/specific gravity of core-sheath composite fiber)×10$^{-3}$ Specific gravity of core-sheath composite fiber (g/cm$^3$)=specific gravity of core polymer×ratio of core+specific gravity of sheath polymer×ratio of sheath.

With regard to the examples, the specific gravity of nylon 6 was 1.14 g/cm$^3$, and the specific gravity of the easily alkaline elutable polyester was 1.38 g/cm$^3$.

(c) Correction coefficient=fiber diameter (calculated value)/fiber diameter (actually measured value)

N. Observation of Fiber Cross-Section Under Optical Microscope

A thin cut section of about 6 microns in thickness in a fiber transverse direction was cut out, after fixing the fiber with wax or the like according to need. Then, a fiber cross-section was observed under an optical microscope (80iTP-DPH-S by Nikon corporation). The fiber cross-section was observed with the observation magnification changed according to need; for instance, 1000 times when the entire fiber yarn thread was observed, and 3000 times when a single yarn was observed.

O. Percentage of Exposure of Polyester Portion of Composite Fiber

After a fiber section was photographed under an optical microscope as described in N above, the fiber diameter and the length of an exposed portion of the polyester portion were measured in the photograph via a flexible curve ruler, and were calculated by the following expression:

Percentage of exposure (%)=(total sum of lengths of exposed portions)/(2π×fiber diameter)×100.

P. Yarn-Making Property

The yarn breakage per 1 ton at the time of the yarn making of the core-sheath composite fiber yarn thread has been shown with the following references:
a: yarn breakage occurring less than twice
b: yarn breakage occurring twice or more and less than four times
c: yarn breakage occurring four times or more and less than six times
d: yarn breakage occurring six times or more and less than eight times
e: yarn breakage occurring eight times or more.

Q. Degree of Fineness

The degree of fineness was pursuant to A method, 8.3.1 section in JIS L1013 (2010).

Official moisture percentage (%)=official moisture percentage of sheath polymer×ratio of sheath+official moisture percentage of core polymer×ratio of core With regard to the examples, the official moisture percentage of nylon 6 is 4.5%, and the official moisture percentage of the easily alkaline elutable polyester is 0.4%.

R. Elongation Percentage

The elongation percentage was pursuant to 8.5.1 section of JIS L1013 (2010). Incidentally, as for the measurement conditions, a constant-speed tension type tester (TENSILON by Orientec (KK) company) was used, with a grip interval of 50 cm and a tensile speed of 50 cm/min.

S. Number of Fluffs

Using a multi-point fluff counting apparatus (MFC-120 by Toray Engineering Co., Ltd.), fiber was unwound at 600 m/min from a randomly selected fiber package (1 piece), and measurement was performed for 20 minutes to count the number of fluffs displayed in the apparatus. Incidentally, a warping guide bar (made of a stainless, with a guide interval of 1 mm) was provided before a measurement point, and the fiber was passed through the guide bar.

T. Alkaline Elutability

Four small textile pieces having been woven were prepared, and were treated with a 20 g/l sodium hydroxide aqueous solution at 95° C. (a temperature increase of 2° C.). The pieces were extracted at the time of 30 minutes, 60 minutes, 90 minutes and 120 minutes, and, at each time, the rate of amount reduction of the polyester component was measured. With regard to the time required until the rate of amount reduction reached 90% or more, 5-grade evaluation was performed on the basis of the following references:
   ⊚: In the case of extraction at 30 minutes, the rate of amount reduction is 90% or more.
   ○: In the case of extraction at 60 minutes, the rate of amount reduction is 90% or more.
   Δ: In the case of extraction at 90 minutes, the rate of amount reduction is 90% or more.
   x: In the case of extraction at 120 minutes, the rate of amount reduction is 90% or more.
   xx: In the case of extraction at 120 minutes, the rate of amount reduction is less than 90%.

U. Softness

From the fiber, a plain woven cloth whose weaving density was 140 wales/2.54 cm and 105 courses/2.54 cm was made, and was permeated with 20 g/l sodium hydroxide aqueous solution at 95° C. for 60 minutes so that the polyester component was dissolved and removed. After that, the cloth was washed with running water for one hour, and then air-dried for one day. With regard to the obtained plain woven cloth, the softness was evaluated by the tactile senses of testers (30 people) in four grades on the basis of the following references:
   ⊚: Softness is very good.
   ○: Softness is fairly good.
   Δ: There is not much softness.
   x: There is no softness.

A synthetic method for the titanium compound used in the following examples will be shown.

(Ti-Lactic Acid Catalyst)

In a nitrogen-substituted reaction tank, 536.4 g of lactic acid (by Wako Pure Chemical Industries, Ltd.) was added to 40 L of ethylene glycol 40 L as a reaction solvent, and was heated to 80° C. Subsequently, after the cooling to 40° C., 712 g of titanium tetraisopropoxide (by Nippon Soda Co., Ltd.) was added, and was stirred for 24 hours. In this manner, a Ti-lactic acid catalyst (titanium content: 2.63 g/L) was obtained.

(Ti-Mannitol Catalyst)

In a nitrogen-substituted reaction tank, 456.8 g of mannitol (by Tokyo Chemical Industry Co., Ltd.) was added to 40 L of ethylene glycol as a reaction solvent, and was dissolved by heating it to 80° C. Subsequently, after the cooling to 40° C., 712 g of titanium tetraisopropoxide (by Nippon Soda Co., Ltd.) was added, and was stirred for 24 hours. In this manner, a Ti-mannitol catalyst (titanium content: 2.63 g/L) was obtained.

Example 1

Polymerization Method

Into an ester exchange reaction tank equipped with a rectifying tower, terephthalic acid dimethyl was put in an amount of 927 mass parts, and ethylene glycol was put in 595 mass parts. Furthermore, dimethyl adipate was put in so that the concentration thereof relative to the total acid component in a polyester obtained became 5.1 mol %, and dimethyl 5-sodium sulfoisophthalate was put in that the concentration thereof became 2.4 mol % relative to the total acid component in the polyester obtained. After that, a Ti-lactic acid catalyst was added to be in an amount of 5 ppm on a titanium element equivalent basis, tetrakis (2,4-di-t-butyl-5-methylphenyl)[1, 1-biphenyl]-4,4'-diylbisphosphonite (GSY-P101 by Osaki Industry Co., LTD.) was added as a phosphorus compound A to be in an amount of 10 ppm on a phosphorus element equivalent basis, and magnesium acetate tetrahydrate was added in an amount of 600 ppm. After that, EAH20 (a mixture of 20 mass % of tetraethylammonium hydroxide, 67 mass % of water and 13 mass % of methanol, by Sanyo Chemical company) was added in an amount of 1200 ppm (29.3 ppm on a nitrogen equivalent basis). After that, the temperature of the ester exchange reaction tank was gradually raised to make reactions to progress while distilling methanol produced during the ester exchange reaction away from the reaction system so that a low polymer was obtained. After that, the low polymer was transferred as a liquid from the ester exchange reaction tank into a polymerization reaction tank. After the liquid transfer ended, titanium oxide in form of an ethylene glycol slurry was added so that the concentration thereof in the polyester became 0.07 mass %. Furthermore, 5 minutes later, the temperature of the inside of the reaction tank was gradually raised from 240° C. to 280° C., and the pressure was lowered to 50 Pa while ethylene glycol was distilled away. At the time point when a predetermined stirrer torque (electric power value) was reached, the reaction system was subjected to nitrogen purge, and thus normal pressure was resumed and the polymerization reaction was stopped. After being discharged in a strand form and being cooled, the discharge was immediately cut to obtain pellets of polyester. Incidentally, the time from the start of pressure reduction to when the predetermined stirrer torque was reached was about 2 hours and 15 minutes. The obtained polyester was a polyester having an intrinsic viscosity of 0.62, a DEG content of 2.0 mass %, a b value of 17.9 and a Δ intrinsic viscosity 280 of 0.020 and being excellent in color tone and heat resistance. The properties of the obtained polyester are indicated in Table 1.

Fiber Spinning Method

Chips of the polyester were dried by a normal method so that the moisture percentage became 0.01 mass % or less. Besides, as a polyamide, nylon 6 chips whose sulfuric acid relative viscosity (ηr) was 2.6 was dried by a normal method so that the moisture percentage became 0.05 mass % or less.

The obtained polyester chips were melted at a melt temperature of 270° C. and the nylon 6 chips at 270° C., at proportions of 20 mass % of the foregoing polyester chips and 80 mass % of the nylon 6 chips, individually in separate pressure melters, and were joined into a confluence in a spinning pack and a nozzle and formed into a core-sheath composite, which was discharged from a nozzle. As for the nozzle, a nozzle which, per single yarn (hole), makes a sheath component in eight divisions and in which the number of holes was 36 was used. Besides, the spinning temperature was 270° C. After being discharged from the nozzle, the discharge was cooled by a cool wind of 18° C., and was supplied with oil, and then was drawn to 2.20 times at a first godet roll temperature of 90° C. and a second godet roll temperature of 150° C., and was wound at a winding speed of 4000 m/min to obtain a core-sheath composite fiber having a stellate structure (FIG. 1(a)) in which a sheath portion made of nylon 6 of 54 dtex-18 filaments was split in eight divisions.

Evaluation Method

The obtained core-sheath composite fiber was evaluated regarding yarn-making property, percentage of exposure, degree of fineness, elongation percentage, the number of fluffs, alkaline elutability and softness. Results of evaluation are shown in Table 3.

Examples 2 to 5

Polymerization and spinning were carried out substantially in the same manner as in Example 1, except that the polyester-polyamide mass ratio and the fiber sectional shape conformed to the conditions indicated in Tables 1 and 3, to obtain core-sheath composite fibers having stellate structures (FIG. 1(a) to (c)) in which a sheath portion made of nylon 6 of 54 dtex-18 filaments was split in 5, 6 or 8 portions.

The obtained core-sheath composite fibers were evaluated regarding yarn-making property, percentage of exposure, degree of fineness, elongation percentage, the number of fluffs, alkaline elutability and softness. Results of evaluation are shown in Table 3.

Examples 1 to 5 were good in yarn-making property, low in occurrence of fluffs, and very excellent in alkaline elutability.

Besides, plain woven cloths employing the obtained core-sheath composite fibers, in accompany with 20 g/l sodium hydroxide aqueous solution, exhibited a polyester dissolution rate of 97% or higher after 60 minutes×95° C. (temperature rise of 2° C.), and the feel (softness) of the plain woven cloths was good. Examples 1 to 2, 4, and 5 whose single yarn fineness degrees were small were very excellent in softness.

Examples 6 to 10

Polymerization and spinning were carried out substantially in the same manner as in Example 1, except that the kind of a titanium compound and the kind and amount of a phosphate compound conformed to the conditions indicated in Tables 1 and 3, to obtain core-sheath composite fibers having stellate structures (FIG. 1(a)) in which a sheath portion made of nylon 6 of 54 dtex-18 filaments was split in 8 portions. The characteristics of the obtained polyester chips (b value, Δ intrinsic viscosity 280) are indicated in Table 1.

The obtained core-sheath composite fibers were evaluated regarding yarn-making property, percentage of exposure, degree of fineness, elongation percentage, the number of fluffs, alkaline elutability and softness. Results of evaluation are shown in Table 3.

Examples 6 to 10 were good in yarn-making property, low in occurrence of fluffs, and very excellent in alkaline elutability.

Besides, plain woven cloths employing the obtained core-sheath composite fibers, in accompany with 20 g/l sodium hydroxide aqueous solution, exhibited a polyester dissolution rate of 97% or higher after 60 minutes×95° C. (temperature rise of 2° C.), and the feel (softness) of the plain woven cloths was very excellent.

Examples 11 to 15

Polymerization and spinning were carried out substantially in the same manner as in Example 1, except that the kind and amount of a titanium compound and the kind and amount of a phosphate compound conformed to the conditions indicated in Tables 2 and 4, to obtain core-sheath composite fibers having stellate structures (FIG. 1(a)) in which a sheath portion made of nylon 6 of 54 dtex-18 filaments was split in 8 portions. Incidentally, the characteristics of the obtained polyester chips (b value, Δ intrinsic viscosity 280) are indicated in Table 2.

The obtained core-sheath composite fibers were evaluated regarding yarn-making property, percentage of exposure, degree of fineness, elongation percentage, the number of fluffs, alkaline elutability and softness. Results of evaluation are shown in Table 4.

Examples 11 to 15 were good in yarn-making property, low in occurrence of fluffs, and excellent in alkaline elutability.

Plain woven cloths employing the obtained core-sheath composite fibers, in accompany with 20 g/l sodium hydroxide aqueous solution, exhibited a polyester dissolution rate of 97% or higher after 60 minutes×95° C. (temperature rise of 2° C.), and the feel (softness) of the plain woven cloths was very good.

Comparative Examples 1 to 6

Polymerization and spinning were carried out substantially in the same manner as in Example 1, except that the amount of an adipic acid compound and the amount of an isophthalic acid component conformed to the conditions indicated in Tables 5 and 6, to obtain core-sheath composite fibers having stellate structures (FIG. 1(a)) in which a sheath portion made of nylon 6 of 54 dtex-18 filaments was split in 8 portions. The characteristics of the obtained polyester chips (b value, Δ intrinsic viscosity 280) are indicated in Table 5.

The obtained core-sheath composite fibers were evaluated regarding yarn-making property, percentage of exposure, degree of fineness, elongation percentage, the number of fluffs, alkaline elutability and softness. Results of evaluation are shown in Table 6.

Comparative Examples 1, 3 and 5, although good in yarn-making property and low in occurrence of fluffs, was inferior in alkaline elutability.

Plain woven cloths employing the obtained core-sheath composite fibers, in accompany with 20 g/l sodium hydroxide aqueous solution, exhibited a polyester dissolution rate of less than 90% after 60 minutes×95° C. (temperature rise of 2° C.), which was a state in which polyester was left undissolved, and the feel (softness) of the plain woven cloths was inferior.

Comparative Examples 2, 4 and 6, although small in occurrence of fluffs and excellent in alkaline elutability, was inferior in yarn-making property as yarn breakage frequently occurred caused by low heat resistance of the polyester.

Plain woven cloths employing the obtained core-sheath composite fibers, in accompany with 20 g/l sodium hydroxide aqueous solution, exhibited a polyester dissolution rate of 97% or more after 60 minutes×95° C. (temperature rise of 2° C.), and the feel (softness) of the plain woven cloths was good.

Comparative Example 7

Polymerization and spinning were carried out substantially in the same manner as in Example 1, except that the polyester chips were replaced with non-copolymerized polyethylene terephthalate chips (an intrinsic viscosity of 0.62, a DEG content of 1.0 mass %, a b value of 7.8, a Δ intrinsic viscosity 280 of 0.026), to obtain a core-sheath composite fiber having a stellate structure (FIG. 1(a)) in which a sheath portion made of nylon 6 of 54 dtex-18 filaments was split in 8 portions.

The obtained core-sheath composite fiber exhibited a yarn-making property (a), a percentage of exposure (7%), a degree of fineness (54.0 dtex), an elongation percentage (45.8%), the number of fluffs (5 pieces/12000 m), an alkaline elutability (xx), and a softness (x).

Comparative Examples 7, although good in yarn-making property, was high in occurrence of fluffs and inferior in alkaline elutability, was inferior in alkaline elutability.

Plain woven cloths employing the obtained core-sheath composite fiber, in accompany with 20 g/l sodium hydroxide aqueous solution, exhibited a polyester dissolution rate of less than 90% after 60 minutes×95° C. (temperature rise of 2° C.), which was a state in which polyester was left undissolved in large amounts, and the feel (softness) of the plain woven cloths was inferior.

TABLE 1

| | Polyester component | | | | | | | |
|---|---|---|---|---|---|---|---|---|
| | Adipic acid component | 5-Sodium sulfoisophthalate component | Titanium compound | | Phosphorus compound | | Polymer property | |
| | Content mol % | Content mol % | Kind | Titanium element-equivalent content ppm | Kind | Phosphorus element-equivalent content ppm | Polymer b value | ΔIntrinsic viscosity 280 |
| Example 1 | 5.1 | 2.4 | Ti lactate | 5 | Phosphorus compound A | 10 | 17.9 | 0.020 |
| Example 2 | 5.1 | 2.4 | Ti lactate | 5 | Phosphorus compound A | 10 | 17.9 | 0.020 |
| Example 3 | 5.1 | 2.4 | Ti lactate | 5 | Phosphorus compound A | 10 | 17.9 | 0.020 |
| Example 4 | 5.1 | 2.4 | Ti lactate | 5 | Phosphorus compound A | 10 | 17.9 | 0.020 |
| Example 5 | 5.1 | 2.4 | Ti lactate | 5 | Phosphorus compound A | 10 | 17.9 | 0.020 |
| Example 6 | 5.1 | 2.4 | Ti lactate | 5 | Phosphorus compound B | 10 | 17.5 | 0.020 |
| Example 7 | 5.1 | 2.4 | Ti lactate | 5 | Phosphorus compound C | 10 | 18.3 | 0.020 |
| Example 8 | 5.1 | 2.4 | Ti lactate | 5 | Phosphorus compound D | 15 | 15.5 | 0.020 |
| Example 9 | 5.1 | 2.4 | Ti mannitol | 5 | Phosphorus compound A | 10 | 17.7 | 0.019 |
| Example 10 | 5.1 | 2.4 | Ti mannitol | 5 | Phosphorus compound D | 10 | 12.8 | 0.010 |

Phosphorus compound A: tetrakis(2,4-di-t-butyl-5-methylphenyl)[1,1-biphenyl]-4,4'-diylbisphosphonite (GSY-P101, by Osaki Industry Co., LTD.)
Phosphorus compound B: tris[2-{(2,4,8,10-tetra-t-butyldibenz[d,f][1,3,2]-dioxaphosphepin-6-yl)oxy}ethyl]amine (IRGAFOS 12, by Ciba Specialty Chemicals)
Phosphorus compound C: bis(2,4-di-tert-butyl-5-methylphenyl)[1,1-bisphenyl]-4-ylphosphonite
Phosphorus compound D: trimethylphosphate

TABLE 2

| | Polyester component | | | | | | | |
|---|---|---|---|---|---|---|---|---|
| | Adipic acid component | 5-Sodium sulfoisophthalate component | Titanium compound | | Phosphorus compound | | Polymer property | |
| | Content mol % | Content mol % | Kind | Titanium element-equivalent content ppm | Kind | Phosphorus element-equivalent content ppm | Polymer b value | ΔIntrinsic viscosity 280 |
| Example 11 | 5.1 | 2.4 | Ti lactate | 15 | Phosphorus compound A | 3 | 20.5 | 0.030 |
| Example 12 | 5.1 | 2.4 | Ti lactate | 2 | Phosphorus compound A | 45 | 20.2 | 0.010 |
| Example 13 | 5.1 | 2.4 | Sb$_2$O$_3$ | 400 | Phosphorus compound A | 10 | 13.5 | 0.015 |
| Example 14 | 5.1 | 2.4 | Ti mannitol | 15 | Phosphorus compound A | 3 | 20.2 | 0.028 |
| Example 15 | 5.1 | 2.4 | Ti mannitol | 2 | Phosphorus compound A | 45 | 20.1 | 0.009 |

Phosphorus compound A: tetrakis(2,4-di-t-butyl-5-methylphenyl)[1,1-biphenyl]-4,4'-diylbisphosphonite (GSY-P101, by Osaki Industry Co., LTD.)
Sb$_2$O$_3$: diantimony trioxide (by NIHON SEIKO CO., LTD.)

TABLE 3

| | Polyester-to-polyamide mass ratio | Fiber cross-sectional shape | Yarn-making property | Percentage of exposure % | Degree of fineness dtex | Elongation percentage % | Number of fluffs (Pieces/12000 m) | Alkaline elutability | Softness |
|---|---|---|---|---|---|---|---|---|---|
| Example 1 | 20:80 | FIG. 1(a) | a | 7 | 54.2 | 46.1 | 0 | ⊚ | ⊚ |
| Example 2 | 20:80 | FIG. 1(b) | a | 5 | 54.3 | 44.7 | 0 | ⊚ | ⊚ |
| Example 3 | 20:80 | FIG. 1(c) | a | 4 | 54.2 | 45.4 | 0 | ⊚ | ○ |
| Example 4 | 10:90 | FIG. 1(a) | a | 7 | 53.9 | 45.1 | 0 | ⊚ | ⊚ |
| Example 5 | 30:70 | FIG. 1(a) | a | 7 | 54.5 | 45.9 | 0 | ⊚ | ⊚ |
| Example 6 | 20:80 | FIG. 1(a) | a | 7 | 54.0 | 43.1 | 0 | ⊚ | ⊚ |
| Example 7 | 20:80 | FIG. 1(a) | a | 7 | 54.5 | 44.9 | 1 | ⊚ | ⊚ |
| Example 8 | 20:80 | FIG. 1(a) | a | 7 | 54.4 | 45.8 | 0 | ⊚ | ⊚ |

TABLE 3-continued

|  | Polyester-to-polyamide mass ratio | Fiber cross-sectional shape | Yarn-making property | Percentage of exposure % | Degree of fineness dtex | Elongation percentage % | Number of fluffs (Pieces/12000 m) | Alkaline elutability | Softness |
|---|---|---|---|---|---|---|---|---|---|
| Example 9 | 20:80 | FIG. 1(a) | a | 7 | 54.1 | 43.9 | 0 | ◎ | ◎ |
| Example 10 | 20:80 | FIG. 1(a) | a | 7 | 54.2 | 46.3 | 0 | ◎ | ◎ |

TABLE 4

|  | Polyester-to-polyamide mass ratio | Fiber cross-sectional shape | Yarn-making property | Percentage of exposure % | Degree of fineness dtex | Elongation percentage % | Number of fluffs (Pieces/12000 m) | Alkaline elutability | Softness |
|---|---|---|---|---|---|---|---|---|---|
| Example 11 | 20:80 | FIG. 1(a) | c | 7 | 54.5 | 43.4 | 0 | ◎ | ◎ |
| Example 12 | 20:80 | FIG. 1(a) | c | 7 | 54.0 | 44.9 | 1 | ◎ | ◎ |
| Example 13 | 20:80 | FIG. 1(a) | c | 7 | 54.1 | 45.2 | 0 | ◎ | ◎ |
| Example 14 | 20:80 | FIG. 1(a) | c | 7 | 54.0 | 44.1 | 0 | ◎ | ◎ |
| Example 15 | 20:80 | FIG. 1(a) | c | 7 | 54.3 | 44.9 | 1 | ◎ | ◎ |

TABLE 5

| | Polyester component | | | | | | | |
|---|---|---|---|---|---|---|---|---|
| | Adipic acid component | 5-Sodium sulfoisophthalate component | Titanium compound | | Phosphorus compound | | Polymer property | |
| | Content mol % | Content mol % | Kind | Titanium element-equivalent content ppm | Kind | Phosphorus element-equivalent content ppm | Polymer b value | ΔIntrinsic viscosity 280 |
| Comparative example 1 | 2.5 | 2.4 | Ti lactate | 5 | Phosphorus compound A | 10 | 14.0 | 0.015 |
| Comparative example 2 | 6.3 | 2.4 | Ti lactate | 5 | Phosphorus compound A | 10 | 18.0 | 0.028 |
| Comparative example 3 | 2.8 | 1.8 | Ti lactate | 5 | Phosphorus compound A | 10 | 13.3 | 0.012 |
| Comparative example 4 | 6.2 | 5.8 | Ti lactate | 5 | Phosphorus compound A | 10 | 16.0 | 0.035 |
| Comparative example 5 | 5.1 | 1.7 | Ti lactate | 5 | Phosphorus compound A | 10 | 18.3 | 0.017 |
| Comparative example 6 | 5.1 | 6.5 | Ti lactate | 5 | Phosphorus compound A | 10 | 15.2 | 0.032 |

Phosphorus compound A: tetrakis(2,4-di-t-butyl-5-methylphenyl)[1,1-biphenyl]-4,4'-diylbisphosphonite (GSY-P101, by Osaki Industry Co., LTD.)

TABLE 6

|  | Polyester-to-polyamide mass ratio | Fiber cross-sectional shape | Yarn-making property | Percentage of exposure % | Degree of fineness dtex | Elongation percentage % | Number of fluffs (Pieces/12000 m) | Alkaline elutability | Softness |
|---|---|---|---|---|---|---|---|---|---|
| Comparative example 1 | 20:80 | FIG. 1(a) | a | 7 | 54.4 | 45.3 | 1 | X | X |
| Comparative example 2 | 20:80 | FIG. 1(a) | d | 7 | 54.4 | 45.5 | 0 | ◎ | ◎ |
| Comparative example 3 | 20:80 | FIG. 1(a) | a | 7 | 54.0 | 44.1 | 1 | X | X |
| Comparative example 4 | 20:80 | FIG. 1(a) | d | 7 | 54.5 | 44.4 | 0 | ◎ | ◎ |
| Comparative example 5 | 20:80 | FIG. 1(a) | a | 7 | 53.9 | 46.3 | 0 | Δ | Δ |
| Comparative example 6 | 20:80 | FIG. 1(a) | d | 7 | 54.2 | 45.6 | 0 | ◎ | ◎ |

As is apparent from the results in Tables 2 and 4, our core-sheath composite fibers, in comparison with the conventional core-sheath composite fiber, restrained the separation at the inner interface of polyester-and-polyamide composite fiber at the time of the yarn making of the core-sheath composite fiber so that fluffing is considerably improved, and can be said to be a core-sheath composite fiber that is good in fiber spinning operability, exhibits excellent solubility in alkalis, and achieves very remarkable effects.

Example 16

Polymerization Method

Into an ester exchange reaction tank equipped with a rectifying tower, terephthalic acid dimethyl was put in an amount of 927 mass parts, and ethylene glycol was put in 595 mass parts. Furthermore, dimethyl adipate was put in so that the concentration thereof relative to the total acid component in a polyester obtained became 5.1 mol %, and dimethyl 5-sodium sulfoisophthalate was put in that the concentration thereof became 2.4 mol % relative to the total acid component in the polyester obtained. After that, a Ti-lactic acid catalyst was added to be in an amount of 5 ppm on a titanium element equivalent basis, tetrakis (2,4-di-t-butyl-5-methylphenyl)[1, 1-biphenyl]-4,4'-diylbisphosphonite (GSY-P101 by Osaki Industry Co., LTD.) was added as a phosphorus compound A to be in an amount of 10 ppm on a phosphorus element equivalent basis, and magnesium acetate tetrahydrate was added in an amount of 600 ppm. After that, EAH20 (a mixture of 20 mass % of tetraethylammonium hydroxide, 67 mass % of water and 13 mass % of methanol, by Sanyo Chemical company) was added in an amount of 1200 ppm (29.3 ppm on a nitrogen equivalent basis). After that, the temperature of the ester exchange reaction tank was gradually raised to make reactions to progress while distilling methanol produced during the ester exchange reaction away from the reaction system so that a low polymer was obtained. After that, the low polymer was transferred as a liquid from the ester exchange reaction tank into a polymerization reaction tank. After the liquid transfer ended, titanium oxide in form of an ethylene glycol slurry was added so that the concentration thereof in the polyester became 0.07 mass %. Furthermore, 5 minutes later, the temperature of the inside of the reaction tank was gradually raised from 240° C. to 280° C., and the pressure was lowered to 50 Pa while ethylene glycol was distilled away. At the time point when a predetermined stirrer torque (electric power value) was reached, the reaction system was subjected to nitrogen purge, and thus normal pressure was resumed and the polymerization reaction was stopped. After being discharged in a strand form and being cooled, the discharge was immediately cut to obtain pellets of polyester. The time from the start of pressure reduction to when the predetermined stirrer torque was reached was about 2 hours and 15 minutes. The obtained polyester was a polyester having an intrinsic viscosity of 0.62, a DEG content of 2.0 mass %, a b value of 17.9, a Δ intrinsic viscosity 280 of 0.020, a carboxyl terminal group amount of 47.4 eq/t and a melting point of 235° C. and being excellent in color tone and heat resistance. The properties of the obtained polyester are indicated in Table 7.

Fiber Spinning Method

Chips of the polyester were dried by a normal method so that the moisture percentage became 0.01 mass % or less. Besides, as a polyamide, nylon 6 chips having a sulfuric acid relative viscosity (ηr) of 2.6, an amino terminal group amount of $5.20 \times 10^{-5}$ mol/g and a melting point of 215° C. was dried by a normal method so that the moisture percentage became 0.05 mass % or less. The property of this polyamide component is indicated in Table 7.

The obtained polyester chips were melted at a melt temperature of 270° C. and the nylon 6 chips at 270° C., at proportions of 20 mass % of the foregoing polyester chips and 80 mass % of the nylon 6 chips, individually in separate pressure melters, and were joined into a confluence in a spinning pack and a nozzle and formed into a core-sheath composite, which was discharged from a nozzle. As for the nozzle, a nozzle which, per single yarn (hole), makes a sheath component in 8 portions and in which the number of holes was 36 was used. The spinning temperature was 270° C. After being discharged from the nozzle, the discharge was cooled by a cool wind of 18° C., and was fed oil agent, and then was drawn to 2.20 times at a first godet roll temperature of 90° C. and a second godet roll temperature of 150° C., and was wound at a winding speed of 4000 m/min to obtain a core-sheath composite fiber having a stellate structure (FIG. 1(a)) in which a sheath portion made of nylon 6 of 54 dtex-18 filaments was split in 8 portions.

Evaluation Method

The obtained core-sheath composite fiber was evaluated regarding yarn-making property, percentage of exposure, degree of fineness, elongation percentage, the number of fluffs, the unit reaction rate (A) of the terephthalic acid that caused the ester-amide exchange reaction, alkaline elutability and softness. Results of evaluation are shown in Table 8.

Examples 17 to 20

Polymerization and spinning were carried out substantially in the same manner as in Example 16, except that the polyester-polyamide mass ratio and the fiber sectional shape conformed to the conditions indicated in Tables 7 and 8, to obtain core-sheath composite fibers having stellate structures (FIG. 1(a) to (c)) in which a sheath portion made of nylon 6 of 54 dtex-18 filaments was split in 5, 6 or 8 portions.

The obtained core-sheath composite fibers were evaluated regarding yarn-making property, percentage of exposure, degree of fineness, elongation percentage, the number of fluffs, the unit reaction rate (A) of the terephthalic acid that caused the ester-amide exchange reaction, alkaline elutability and softness. Results of evaluation are shown in Table 8.

Examples 16 to 20 were good in yarn-making property, low in occurrence of fluffs, and very excellent in alkaline elutability.

Plain woven cloths employing the obtained core-sheath composite fibers, in accompany with 20 g/l sodium hydroxide aqueous solution, exhibited a polyester dissolution rate of 97% or higher after 60 minutes×95° C. (temperature rise of 2° C.), and the feel (softness) of the plain woven cloths was good. Examples 16, 17, 19 and 20 whose single yarn fineness degrees were small were very excellent in softness.

Examples 21 to 25

Polymerization and spinning were carried out substantially in the same manner as in Example 16, except that the kind of a titanium compound and the kind and amount of a phosphate compound conformed to the conditions indicated in Table 7, to obtain core-sheath composite fibers having stellate structures (FIG. 1(a)) in which a sheath portion made of nylon 6 of 54 dtex-18 filaments was split in 8 portions. Incidentally, the characteristics of the obtained polyester chips are indicated in Table 7.

The obtained core-sheath composite fibers were evaluated regarding yarn-making property, percentage of exposure, degree of fineness, elongation percentage, the number of fluffs, the unit reaction rate (A) of the terephthalic acid that caused the ester-amide exchange reaction, alkaline elutability and softness. Results of evaluation are shown in Table 8.

Examples 21 to 25 were good in yarn-making property, low in occurrence of fluffs, and very excellent in alkaline elutability.

Plain woven cloths employing the obtained core-sheath composite fibers, in accompany with 20 g/l sodium hydroxide aqueous solution, exhibited a polyester dissolution rate of 97% or higher after 60 minutes×95° C. (temperature rise of 2° C.), and the feel (softness) of the plain woven cloths was very excellent.

Examples 26 to 30

Polymerization and spinning were carried out substantially in the same manner as in Example 16, except that the kind and amount of a titanium compound and the kind and amount of a phosphate compound conformed to the conditions indicated in Table 9, to obtain core-sheath composite fibers having stellate structures (FIG. 1($a$)) in which a sheath portion made of nylon 6 of 54 dtex-18 filaments was split in 8 portions.

The characteristics of the obtained polyester chips are indicated in Table 9.

The obtained core-sheath composite fibers were evaluated regarding yarn-making property, percentage of exposure, degree of fineness, elongation percentage, the number of fluffs, the unit reaction rate (A) of the terephthalic acid that caused the ester-amide exchange reaction, alkaline elutability and softness. Results of evaluation are shown in Table 10.

Examples 26 to 30 were good in yarn-making property, low in occurrence of fluffs, and excellent in alkaline elutability.

Plain woven cloths employing the obtained core-sheath composite fibers, in accompany with 20 g/l sodium hydroxide aqueous solution, exhibited a polyester dissolution rate of 97% or higher after 60 minutes×95° C. (temperature rise of 2° C.), and the feel (softness) of the plain woven cloths was very good.

Examples 31 to 32

Polymerization and spinning were carried out substantially in the same manner as in Example 16, except that the amino terminal group amount conformed to the conditions indicated in Table 9, to obtain core-sheath composite fibers having stellate structures (FIG. 1($a$)) in which a sheath portion made of nylon 6 of 54 dtex-18 filaments was split in 8 portions.

Example 33

Polymerization and spinning were carried out substantially in the same manner as in Example 16, except that the amount of amino terminal groups was $5.40 \times 10^{-5}$ mol/g, and the melt temperature of polyester chips, the melt temperature of nylon 6 chips and the spinning temperature were each set to 290° C., to obtain core-sheath composite fibers having stellate structures (FIG. 1($a$)) in which a sheath portion made of nylon 6 of 54 dtex-18 filaments was split in 8 portions.

Example 34

Polymerization and spinning were carried out substantially in the same manner as in Example 16, except that the amount of amino terminal groups was $5.40 \times 10^{-5}$ mol/g, and the melt temperature of polyester chips, the melt temperature of nylon 6 chips and the spinning temperature were each set to 260° C., to obtain core-sheath composite fibers having stellate structures (FIG. 1($a$)) in which a sheath portion made of nylon 6 of 54 dtex-18 filaments was split in 8 portions.

Example 35

Polymerization and spinning were carried out substantially in the same manner as in Example 16, except that the amount of amino terminal groups was $4.50 \times 10^{-5}$ mol/g, the amount of carboxyl terminal groups was 32.0 eq/t, the Δ intrinsic viscosity 280 was 0.035, and the melt temperature of polyester chips, the melt temperature of nylon 6 chips and the spinning temperature were each set to 260° C., to obtain core-sheath composite fibers having stellate structures (FIG. 1($a$)) in which a sheath portion made of nylon 6 of 54 dtex-18 filaments was split in 8 portions.

The core-sheath composite fibers obtained in Examples 31 to 35 were evaluated regarding yarn-making property, percentage of exposure, degree of fineness, elongation percentage, the number of fluffs, the unit reaction rate (A) of the terephthalic acid that caused the ester-amide exchange reaction, alkaline elutability and softness. Results of evaluation are shown in Table 10.

Examples 31 to 35 were good in yarn-making property, low in occurrence of fluffs, and excellent in alkaline elutability.

Plain woven cloths employing the obtained core-sheath composite fibers, in accompany with 20 g/l sodium hydroxide aqueous solution, exhibited a polyester dissolution rate of 97% or higher after 60 minutes×95° C. (temperature rise of 2° C.), and the feel (softness) of the plain woven cloths was very good.

Comparative Examples 8 to 13

Polymerization and spinning were carried out substantially in the same manner as in Example 16, except that the amount of an adipic acid compound and the amount of an isophthalic acid component conformed to the conditions indicated in Table 11, to obtain core-sheath composite fibers having stellate structures (FIG. 1($a$)) in which a sheath portion made of nylon 6 of 54 dtex-18 filaments was split in 8 portions. The characteristics of the obtained polyester chips (b value, Δ intrinsic viscosity 280, the carboxyl terminal group amount and the melting point) are indicated in Table 11.

The obtained core-sheath composite fibers were evaluated regarding yarn-making property, percentage of exposure, degree of fineness, elongation percentage, the number of fluffs, the unit reaction rate (A) of the terephthalic acid that caused the ester-amide exchange reaction, alkaline elutability and softness. Results of evaluation are shown in Table 12.

Comparative Examples 8, 10 and 12, although good in yarn-making property and low in occurrence of fluffs, was inferior in alkaline elutability. Besides, plain woven cloths employing the obtained core-sheath composite fibers, in accompany with 20 g/l sodium hydroxide aqueous solution, exhibited a polyester dissolution rate of less than 90% after 60 minutes×95° C. (temperature rise of 2° C.), which was a state in which polyester was left undissolved, and the feel (softness) of the plain woven cloths was inferior.

Comparative Examples 9, 11 and 13, although small in occurrence of fluffs and excellent in alkaline elutability, was inferior in yarn-making property as yarn breakage frequently occurred caused by low heat resistance of the polyester.

Plain woven cloths employing the obtained core-sheath composite fibers, in accompany with 20 g/l sodium hydroxide aqueous solution, exhibited a polyester dissolution rate of 97% or more after 60 minutes×95° C. (temperature rise of 2° C.), and the feel (softness) of the plain woven cloths was good.

Comparative Example 14

Non-copolymerized polyethylene terephthalate chips (an intrinsic viscosity of 0.62, a DEG content of 1.0 mass %, a b value of 7.8, a Δ intrinsic viscosity 280 of 0.026, a carboxyl terminal group amount of 32.8 eg/t and a melting point of 255° C.) was dried by a normal method so that the moisture percentage became 0.01 mass % or less. As for the polyamide, chips were nylon 6 chips having a sulfuric acid relative viscosity (ηr) of 2.6, an amino terminal group amount of 4.90× $10^{-5}$ mol/g and a melting point of 215° C., and were dried by a normal method so that the moisture percentage became 0.05 mass % or less.

Spinning was carried out in substantially the same manner as in Example 16, except that the melt temperature of the obtained polyester chips was 280° C., the melt temperature of the nylon 6 chips was 280° C. and the spinning temperature was 280° C., to obtain a core-sheath composite fiber having a stellate structure (FIG. 1(a)) in which a sheath portion made of nylon 6 of 54 dtex-18 filaments was split in 8 portions.

The obtained core-sheath composite fiber was evaluated regarding yarn-making property, percentage of exposure, degree of fineness, elongation percentage, the number of fluffs, the unit reaction rate (A) of the terephthalic acid that caused the ester-amide exchange reaction, alkaline elutability and softness. Results of evaluation are shown in Table 12.

Comparative Example 14, although good in yarn-making property, was high in occurrence of fluffs and inferior in alkaline elutability.

Plain woven cloths employing the obtained core-sheath composite fiber, in accompany with 20 g/l sodium hydroxide aqueous solution, exhibited a polyester dissolution rate of less than 90% after 60 minutes×95° C. (temperature rise of 2° C.), which was a state in which polyester was left undissolved, and the feel (softness) of the plain woven cloths was inferior.

TABLE 7

| | Polyester component | | | | | |
|---|---|---|---|---|---|---|
| | | | Titanium compound | | Phosphorus compound | |
| | Adipic acid component Content mol % | 5-Sodium sulfoisophthalate component Content mol % | Kind | Titanium element-equivalent content ppm | Kind | Phosphorus element-equivalent content ppm |
| Example 16 | 5.1 | 2.4 | Ti lactate | 5 | Phosphorus compound A | 10 |
| Example 17 | 5.1 | 2.4 | Ti lactate | 5 | Phosphorus compound A | 10 |
| Example 18 | 5.1 | 2.4 | Ti lactate | 5 | Phosphorus compound A | 10 |
| Example 19 | 5.1 | 2.4 | Ti lactate | 5 | Phosphorus compound A | 10 |
| Example 20 | 5.1 | 2.4 | Ti lactate | 5 | Phosphorus compound A | 10 |
| Example 21 | 5.1 | 2.4 | Ti lactate | 5 | Phosphorus compound B | 10 |
| Example 22 | 5.1 | 2.4 | Ti lactate | 5 | Phosphorus compound C | 10 |
| Example 23 | 5.1 | 2.4 | Ti lactate | 5 | Phosphorus compound D | 15 |
| Example 24 | 5.1 | 2.4 | Ti mannitol | 5 | Phosphorus compound A | 10 |
| Example 25 | 5.1 | 2.4 | Ti mannitol | 5 | Phosphorus compound D | 10 |

| | Polyester component Polymer property | | | | Polyamide component Polymer property | | |
|---|---|---|---|---|---|---|---|
| | Polymer b value | ΔIntrinsic viscosity 280 | Amount of carboxyl terminal groups eq/t | Melting point ° C. | ηr | Amount of amino terminal groups ×$10^{-5}$ mol/g | Melting point ° C. |
| Example 16 | 17.9 | 0.020 | 47.4 | 235 | 2.60 | 5.20 | 215 |
| Example 17 | 17.9 | 0.020 | 47.4 | 235 | 2.60 | 5.20 | 215 |
| Example 18 | 17.9 | 0.020 | 47.4 | 235 | 2.60 | 5.20 | 215 |
| Example 19 | 17.9 | 0.020 | 47.4 | 235 | 2.60 | 5.20 | 215 |
| Example 20 | 17.9 | 0.020 | 47.4 | 235 | 2.60 | 5.20 | 215 |
| Example 21 | 17.5 | 0.020 | 49.1 | 235 | 2.60 | 5.20 | 215 |
| Example 22 | 18.3 | 0.020 | 48.8 | 235 | 2.60 | 5.20 | 215 |
| Example 23 | 15.5 | 0.020 | 47.5 | 235 | 2.60 | 5.20 | 215 |
| Example 24 | 17.7 | 0.019 | 47.6 | 235 | 2.60 | 5.20 | 215 |
| Example 25 | 12.8 | 0.010 | 47.5 | 235 | 2.60 | 5.20 | 215 |

Phosphorus compound A: tetrakis(2,4-di-t-butyl-5-methylphenyl)[1,1-biphenyl]-4,4'-diylbisphosphonite (GSY-P101, by Osaki Industry Co., LTD.)
Phosphorus compound B: tris[2-{(2,4,8,10-tetra-t-butyldibenz[d,f][1,3,2]-dioxaphosphepin-6-yl)oxy}ethyl]amine (IRGAFOS 12, by Ciba Specialty Chemicals)
Phosphorus compound C: bis(2,4-di-tert-butyl-5-methylphenyl)[1,1-bisphenyl]-4-ylphosphonite
Phosphorus compound D: trimethylphosphate

TABLE 8

| | Production condition Fiber spinning temperature °C. | Polyester-to-polyamide mass ratio | Fiber cross-sectional shape | Yarn-making property | Percentage of exposure % | Degree of fineness dtex | Elongation percentage % | Number of fluffs (Pieces/ 12000 m) | Alkaline elutability | Softness | A (% · mm) |
|---|---|---|---|---|---|---|---|---|---|---|---|
| Example 16 | 270 | 20:80 | FIG. 1(a) | a | 7 | 54.2 | 46.1 | 0 | ◎ | ◎ | 0.0017 |
| Example 17 | 270 | 20:80 | FIG. 1(b) | a | 5 | 54.3 | 44.7 | 0 | ◎ | ◎ | 0.0016 |
| Example 18 | 270 | 20:80 | FIG. 1(c) | a | 4 | 54.2 | 45.4 | 0 | ◎ | ○ | 0.0015 |
| Example 19 | 270 | 10:90 | FIG. 1(a) | a | 7 | 53.9 | 45.1 | 0 | ◎ | ◎ | 0.0006 |
| Example 20 | 270 | 30:70 | FIG. 1(a) | a | 7 | 54.5 | 45.9 | 0 | ◎ | ◎ | 0.0023 |
| Example 21 | 270 | 20:80 | FIG. 1(a) | a | 7 | 54.0 | 43.1 | 0 | ◎ | ◎ | 0.0019 |
| Example 22 | 270 | 20:80 | FIG. 1(a) | a | 7 | 54.5 | 44.9 | 1 | ◎ | ◎ | 0.0018 |
| Example 23 | 270 | 20:80 | FIG. 1(a) | a | 7 | 54.4 | 45.8 | 0 | ◎ | ◎ | 0.0015 |
| Example 24 | 270 | 20:80 | FIG. 1(a) | a | 7 | 54.1 | 43.9 | 0 | ◎ | ◎ | 0.0016 |
| Example 25 | 270 | 20:80 | FIG. 1(a) | a | 7 | 54.2 | 46.3 | 0 | ◎ | ◎ | 0.0015 |

TABLE 9

| | Polyester component | | | | | |
|---|---|---|---|---|---|---|
| | Adipic acid component Content mol % | 5-Sodium sulfoisophthalate component Content mol % | Titanium compound | | Phosphorus compound | |
| | | | Kind | Titanium element-equivalent content ppm | Kind | Phosphorus element-equivalent content ppm |
| Example 26 | 5.1 | 2.4 | Ti lactate | 15 | Phosphorus compound A | 3 |
| Example 27 | 5.1 | 2.4 | Ti lactate | 2 | Phosphorus compound A | 45 |
| Example 28 | 5.1 | 2.4 | $Sb_2O_3$ | 400 | Phosphorus compound A | 10 |
| Example 29 | 5.1 | 2.4 | Ti mannitol | 15 | Phosphorus compound A | 3 |
| Example 30 | 5.1 | 2.4 | Ti mannitol | 2 | Phosphorus compound A | 45 |
| Example 31 | 5.1 | 2.4 | Ti lactate | 5 | Phosphorus compound A | 10 |
| Example 32 | 5.1 | 2.4 | Ti lactate | 5 | Phosphorus compound A | 10 |
| Example 33 | 5.1 | 2.4 | Ti lactate | 5 | Phosphorus compound A | 10 |
| Example 34 | 5.1 | 2.4 | Ti lactate | 5 | Phosphorus compound A | 10 |
| Example 35 | 5.1 | 2.4 | Ti lactate | 5 | Phosphorus compound A | 10 |

| | Polyester component Polymer property | | | | Polyamide component Polymer property | | |
|---|---|---|---|---|---|---|---|
| | Polymer b value | ΔIntrinsic viscosity 280 | Amount of carboxyl terminal groups eq/t | Melting point °C. | ηr | Amount of amino terminal groups ×10⁻⁵ mol/g | Melting point °C. |
| Example 26 | 20.5 | 0.030 | 45.0 | 235 | 2.60 | 5.20 | 215 |
| Example 27 | 20.2 | 0.010 | 47.4 | 235 | 2.60 | 5.20 | 215 |
| Example 28 | 13.5 | 0.015 | 47.5 | 235 | 2.60 | 5.20 | 215 |
| Example 29 | 20.2 | 0.028 | 47.9 | 235 | 2.60 | 5.20 | 215 |
| Example 30 | 20.1 | 0.009 | 46.3 | 235 | 2.60 | 5.20 | 215 |
| Example 31 | 17.9 | 0.020 | 47.4 | 235 | 2.60 | 5.00 | 215 |
| Example 32 | 17.9 | 0.020 | 47.4 | 235 | 2.60 | 5.40 | 215 |
| Example 33 | 17.9 | 0.020 | 47.4 | 235 | 2.60 | 5.40 | 215 |
| Example 34 | 17.9 | 0.020 | 47.4 | 235 | 2.60 | 5.40 | 215 |
| Example 35 | 17.9 | 0.035 | 32.0 | 235 | 2.80 | 4.50 | 215 |

Phosphorus compound A: tetrakis(2,4-di-t-butyl-5-methylphenyl)[1,1-biphenyl]-4,4'-diylbisphosphonite (GSY-P101, by Osaki Industry Co., LTD.)
$Sb_2O_3$: diantimony trioxide (by NIHON SEIKO CO., LTD.)

TABLE 10

|  | Production condition Fiber spinning temperature ° C. | Polyester-to-polyamide mass ratio | Fiber cross-sectional shape | Yarn-making property | Percentage of exposure % | Degree of fineness dtex | Elongation percentage % | Number of fluffs (Pieces/ 12000 m) | Alkaline elutability | Softness | A (% · mm) |
|---|---|---|---|---|---|---|---|---|---|---|---|
| Example 26 | 270 | 20:80 | FIG. 1(a) | c | 7 | 54.5 | 43.4 | 0 | ◎ | ◎ | 0.0012 |
| Example 27 | 270 | 20:80 | FIG. 1(a) | c | 7 | 54.0 | 44.9 | 1 | ◎ | ◎ | 0.0015 |
| Example 28 | 270 | 20:80 | FIG. 1(a) | c | 7 | 54.1 | 45.2 | 0 | ◎ | ◎ | 0.0015 |
| Example 29 | 270 | 20:80 | FIG. 1(a) | c | 7 | 54.0 | 44.1 | 0 | ◎ | ◎ | 0.0018 |
| Example 30 | 270 | 20:80 | FIG. 1(a) | c | 7 | 54.3 | 44.9 | 1 | ◎ | ◎ | 0.0014 |
| Example 31 | 270 | 20:80 | FIG. 1(a) | a | 7 | 54.2 | 43.1 | 2 | ◎ | ◎ | 0.0007 |
| Example 32 | 270 | 20:80 | FIG. 1(a) | b | 7 | 53.9 | 44.5 | 0 | ◎ | ◎ | 0.0023 |
| Example 33 | 290 | 20:80 | FIG. 1(a) | c | 7 | 54.4 | 44.1 | 1 | ◎ | ◎ | 0.0032 |
| Example 34 | 260 | 20:80 | FIG. 1(a) | a | 7 | 53.5 | 43.8 | 0 | ◎ | ◎ | 0.0009 |
| Example 35 | 260 | 20:80 | FIG. 1(a) | a | 7 | 54.0 | 42.1 | 3 | ◎ | ◎ | 0.0003 |

TABLE 11

| | Polyester component | | | | |
|---|---|---|---|---|---|
| | | | Titanium compound | Phosphorus compound | |
| | Adipic acid component Content mol % | 5-Sodium sulfoisophthalate component Content mol % | Kind | Titanium element-equivalent content ppm | Kind | Phosphorus element-equivalent content ppm |
| Comparative example 8 | 2.5 | 2.4 | Ti lactate | 5 | Phosphorus compound A | 10 |
| Comparative example 9 | 6.3 | 2.4 | Ti lactate | 5 | Phosphorus compound A | 10 |
| Comparative example 10 | 2.8 | 1.8 | Ti lactate | 5 | Phosphorus compound A | 10 |
| Comparative example 11 | 6.2 | 5.8 | Ti lactate | 5 | Phosphorus compound A | 10 |
| Comparative example 12 | 5.1 | 1.7 | Ti lactate | 5 | Phosphorus compound A | 10 |
| Comparative example 13 | 5.1 | 6.5 | Ti lactate | 5 | Phosphorus compound A | 10 |
| Comparative example 14 | 0 | 0 | — | — | — | — |

| | Polyester component Polymer property | | | | Polyamide component Polymer property | | |
|---|---|---|---|---|---|---|---|
| | Polymer b value | ΔIntrinsic viscosity 280 | Amount of carboxyl terminal groups eq/t | Melting point ° C. | ηr | Amount of amino terminal groups ×10⁻⁵ mol/g | Melting point ° C. |
| Comparative example 8 | 14.0 | 0.015 | 49.0 | 240 | 2.60 | 5.20 | 215 |
| Comparative example 9 | 18.0 | 0.028 | 46.2 | 235 | 2.60 | 5.20 | 215 |
| Comparative example 10 | 13.3 | 0.012 | 47.8 | 242 | 2.60 | 5.20 | 215 |
| Comparative example 11 | 16.0 | 0.035 | 47.3 | 230 | 2.60 | 5.20 | 215 |
| Comparative example 12 | 18.3 | 0.017 | 41.0 | 238 | 2.60 | 5.20 | 215 |
| Comparative example 13 | 15.2 | 0.032 | 44.5 | 235 | 2.60 | 5.20 | 215 |
| Comparative example 14 | 7.8 | 0.026 | 32.8 | 255 | 2.60 | 4.50 | 215 |

Phosphorus compound A: tetrakis(2,4-di-t-butyl-5-methylphenyl)[1,1-biphenyl]-4,4'-diylbisphosphonite (GSY P101, by Osaki Industry Co., LTD.)

TABLE 12

| | Production condition Fiber spinning temperature ° C. | Polyester-to-polyamide mass ratio | Fiber cross-sectional shape | Yarn-making property | Percentage of exposure % | Degree of fineness dtex | Elongation percentage % | Number of fluffs (Pieces/ 12000 m) | Alkaline elutability | Softness | A (% · mm) |
|---|---|---|---|---|---|---|---|---|---|---|---|
| Comparative example 8 | 270 | 20:80 | FIG. 1(a) | a | 7 | 54.4 | 45.3 | 1 | X | X | 0.0018 |
| Comparative example 9 | 270 | 20:80 | FIG. 1(a) | d | 7 | 54.4 | 45.5 | 0 | ◎ | ◎ | 0.0014 |
| Comparative example 10 | 270 | 20:80 | FIG. 1(a) | a | 7 | 54.0 | 44.1 | 1 | X | X | 0.0018 |
| Comparative example 11 | 270 | 20:80 | FIG. 1(a) | d | 7 | 54.5 | 44.4 | 0 | ◎ | ◎ | 0.0016 |
| Comparative example 12 | 270 | 20:80 | FIG. 1(a) | a | 7 | 53.9 | 46.3 | 0 | Δ | Δ | 0.0011 |
| Comparative example 13 | 270 | 20:80 | FIG. 1(a) | d | 7 | 54.2 | 45.6 | 0 | ◎ | ◎ | 0.0014 |
| Comparative example 14 | 280 | 20:80 | FIG. 1(a) | a | 7 | 53.7 | 44.6 | 9 | XX | X | 0.0002 |

As is apparent from the results in Tables 7 to 10, our core-sheath composite fibers, in comparison with the conventional core-sheath composite fiber, restrained the separation at the inner interface of polyester-and-polyamide composite fiber at the time of the yarn making of the core-sheath composite fiber so that fluffing is considerably improved, and can be said to be a core-sheath composite fiber that is good in fiber spinning operability, exhibits excellent solubility in alkalis, and achieves very remarkable effects.

The invention claimed is:

1. A core-sheath composite fiber comprising a core component comprising an easily alkaline elutable polyester with a main repeating unit constructed of ethylene terephthalate containing 2.0 to 5.5 mol % of an isophthalic acid component containing a metal sulfonate group relative to a total acid component and 3.0 to 6.0 mol % of an adipic acid component relative to the total acid component, and a sheath component comprising a polyamide, wherein the easily alkaline elutable polyester and the polyamide react in an ester-amide exchange reaction at an interface of the easily alkaline elutable polyester and the polyamide and a unit reaction rate of a terephthalic acid that caused the ester-amide exchange reaction is 0.0005 to 0.0025%·mm, wherein the unit reaction rate is calculated from Equation (1):

$$A(\%\cdot mm) = T/S \quad (1)$$

where A is the unit reaction rate, T is the reaction rate (%) of the terephthalic acid that caused the ester-amide exchange reaction, and S is the surface area of the core of the fiber axis portion per 1 mm$^3$ of the core-sheath type composite section fiber (mm$^2$/mm$^3$); and wherein the S is calculated from Equation (2):

$$S(mm^2/mm^3) = X(mm) \times Y(mm/mm^3) \times \text{correction coefficient} \quad (2)$$

where (a) Core portion's circumference length (mm): X,
(b) Fiber length (mm) for unit volume (1 mm$^3$): Y (mm/mm$^3$),
(c) Correction coefficient=fiber diameter (calculated value)/fiber diameter (actually measured value);

$Y(mm/mm^3) = 1 \div $ fiber sectional area(calculated value);

Fiber sectional area(mm$^2$)=[fiber diameter(calculated value)/2]$^2 \times \pi$;

Fiber diameter(calculated value)(mm)=11.28×√(single yarn fineness degree/specific gravity of core-sheath composite fiber)×10$^{-3}$; and Specific gravity of core-sheath composite fiber(g/cm$^3$)
specific gravity of core polymer×ratio of core+
specific gravity of sheath polymer×ratio of sheath.

2. The core-sheath composite fiber is described in claim 1, wherein, in a fiber sectional shape, a sheath portion comprising the polyamide is split in three or more portions by the easily alkaline elutable polyester, and at least the easily alkaline elutable polyester is partially exposed on a fiber surface.

3. The core-sheath composite fiber is described in claim 1, wherein the easily alkaline elutable polyester contains a titanium compound soluble in a polyester at 3 to 10 ppm on a titanium element equivalent basis, and contains a phosphorus compound at 5 to 40 ppm on a phosphorus element equivalent basis.

4. The core-sheath composite fiber is described in claim 1, wherein a mass ratio between the easily alkaline elutable polyester and the polyamide is 5:95 to 40:60.

5. A method of producing the core-sheath composite fiber of claim 1 the method comprising performing melt spinning, with a core component being an easily alkaline elutable polyester having a main repeating unit constructed of ethylene terephthalate and containing 2.0 to 5.5 mol % of an isophthalic acid component containing a metal sulfonate group relative to a total acid component and 3.0 to 6.0 mol % of an adipic acid component relative to the total acid component, and with a sheath component comprising a polyamide.

6. The method described in claim 5, wherein an amino terminal group amount of the polyamide is 5×10$^{-5}$ to 5.5× 10$^{-5}$ mol/g.

7. The method described in claim 5, wherein a carboxyl terminal group amount of polyester is 35 to 55 eq/t.

8. A woven or knitted fabric comprising the core-sheath composite fiber of claim 1 as at least in a portion of the woven or knitted fabric.

9. An ultrathin polyamide fiber formed through dissolution removal of polyester by performing an alkali treatment on the core-sheath composite fiber of claim 1.

10. A woven or knitted fabric comprising the ultrathin polyamide fiber of claim 9.

11. A fibrous product comprising the ultrathin polyamide fiber of claim 9.

12. A woven or knitted fabric comprising the core-sheath composite fiber obtained by using the method of claim 5.

13. An ultrathin polyamide fiber formed through dissolution removal of polyester by performing an alkali treatment on the core-sheath composite fiber obtained by using the method of claim 5.

14. The core-sheath composite fiber is described in claim 2, wherein the easily alkaline elutable polyester contains a titanium compound soluble in a polyester at 3 to 10 ppm on a titanium element equivalent basis, and contains a phosphorus compound at 5 to 40 ppm on a phosphorus element equivalent basis.

15. The core-sheath composite fiber is described in claim 2, wherein a mass ratio between the easily alkaline elutable polyester and the polyamide is 5:95 to 40:60.

16. The core-sheath composite fiber is described in claim 3, wherein a mass ratio between the easily alkaline elutable polyester and the polyamide is 5:95 to 40:60.

* * * * *